(12) United States Patent
Yagi et al.

(10) Patent No.: US 7,768,590 B2
(45) Date of Patent: Aug. 3, 2010

(54) PRODUCTION METHOD OF ACTIVE MATRIX SUBSTRATE, ACTIVE MATRIX SUBSTRATE, AND LIQUID CRYSTAL DISPLAY DEVICE

(75) Inventors: Toshifumi Yagi, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 466 days.

(21) Appl. No.: 11/912,873

(22) PCT Filed: Mar. 7, 2006

(86) PCT No.: PCT/JP2006/304345

§ 371 (c)(1),
(2), (4) Date: Oct. 26, 2007

(87) PCT Pub. No.: WO2006/117929

PCT Pub. Date: Nov. 9, 2006

(65) Prior Publication Data

US 2009/0066870 A1    Mar. 12, 2009

(30) Foreign Application Priority Data

Apr. 26, 2005 (JP) .............................. 2005-128134

(51) Int. Cl.
G02F 1/136 (2006.01)
G02F 1/1333 (2006.01)
(52) U.S. Cl. .......................................... 349/54; 349/40
(58) Field of Classification Search .................. 349/54, 349/40
See application file for complete search history.

(56) References Cited

U.S. PATENT DOCUMENTS

| | | | |
|---|---|---|---|
| 5,691,787 | A | 11/1997 | Shimada et al. |
| 5,953,084 | A | 9/1999 | Shimada et al. |
| 6,052,162 | A | 4/2000 | Shimada et al. |
| 6,097,452 | A | 8/2000 | Shimada et al. |
| 6,195,138 | B1 | 2/2001 | Shimada et al. |

(Continued)

FOREIGN PATENT DOCUMENTS

JP          06-095157 A          4/1994

(Continued)

OTHER PUBLICATIONS

Official communication issued in the International Application No. PCT/JP2006/304345, mailed on Jun. 27, 2006.

*Primary Examiner*—David Nelms
*Assistant Examiner*—Wen-Ying P Chen
(74) *Attorney, Agent, or Firm*—Keating & Bennett, LLP

(57) ABSTRACT

A method of manufacturing an active matrix substrate prevents an increase in the number of production steps while simultaneously preventing electrostatic discharge at a TFT channel. The method preferably includes the steps of forming a short-circuit wiring for connecting a data signal line or a source electrode to a drain electrode or a drain side circuit; successively forming an upper insulating film having an opening for short-circuit wiring separation and a transparent conductive film at a region above the short-circuit wiring as upper layers of the short-circuit wiring; and removing at least the transparent conductive film inside the opening for short-circuit wiring separation and the short-circuit wiring below the opening for short-circuit wiring separation to perform patterning of the pixel electrode and separation of the short-circuit wiring in the same step.

15 Claims, 16 Drawing Sheets

U.S. PATENT DOCUMENTS

| | | |
|---|---|---|
| 6,433,851 B2 | 8/2002 | Shimada et al. |
| 6,472,256 B1 | 10/2002 | Zhang et al. |
| 6,737,708 B2 | 5/2004 | Zhang et al. |
| 2005/0162893 A1 | 7/2005 | Yagi et al. |

FOREIGN PATENT DOCUMENTS

| | | |
|---|---|---|
| JP | 08-114815 A | 5/1996 |
| JP | 11-015017 A | 1/1999 |
| JP | 11-109416 A | 4/1999 |
| JP | 2000-235195 A | 8/2000 |
| JP | 2001-255557 A | 9/2001 |

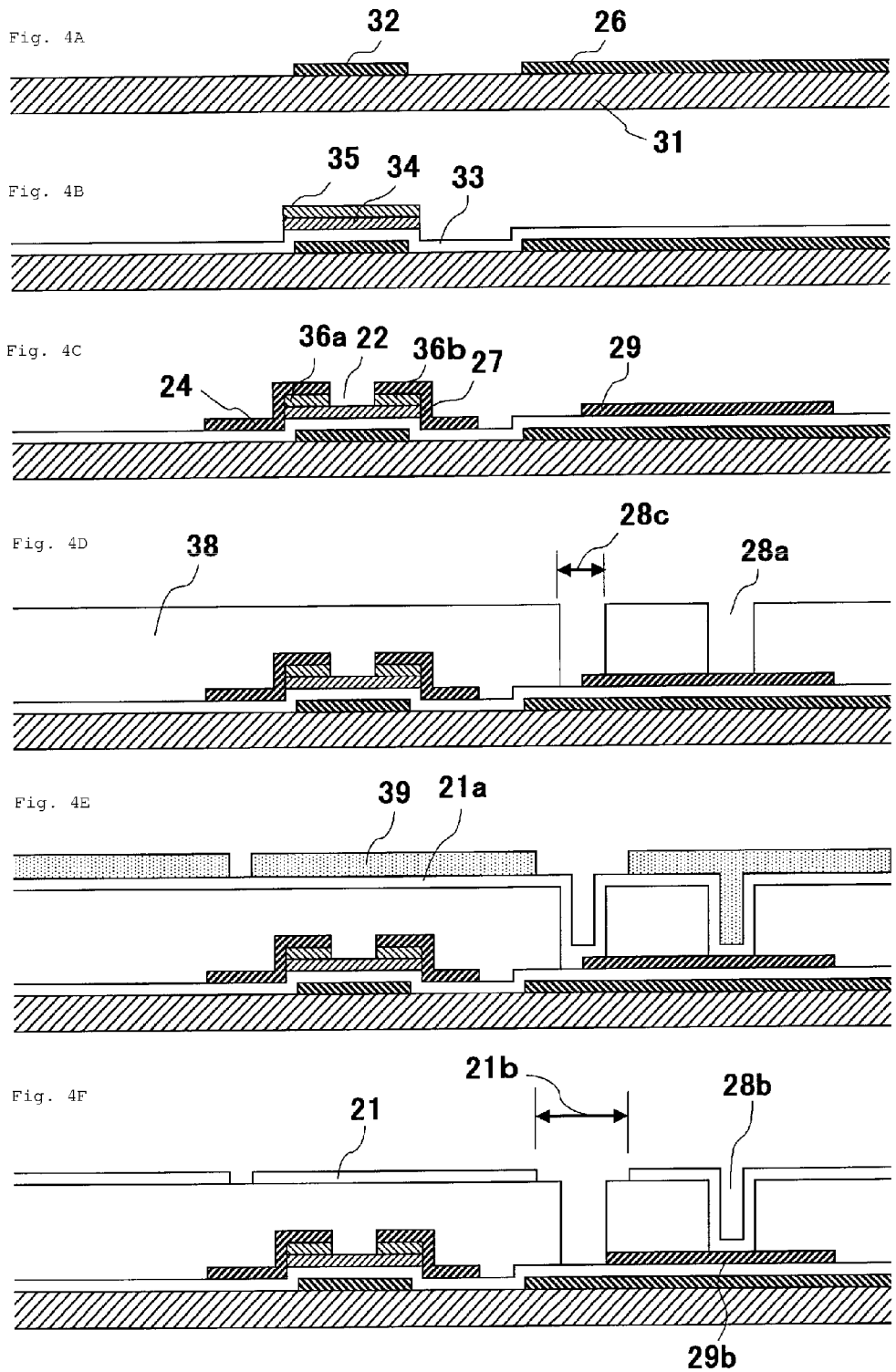

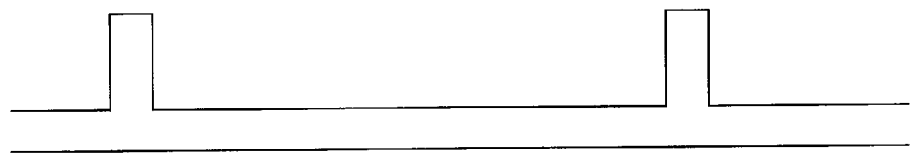
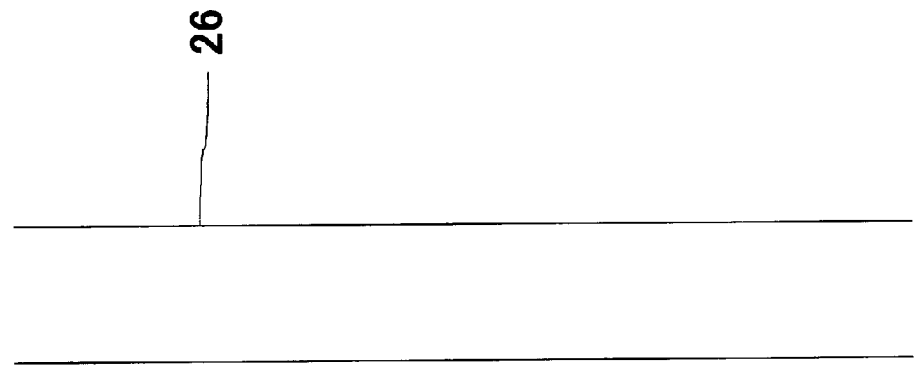
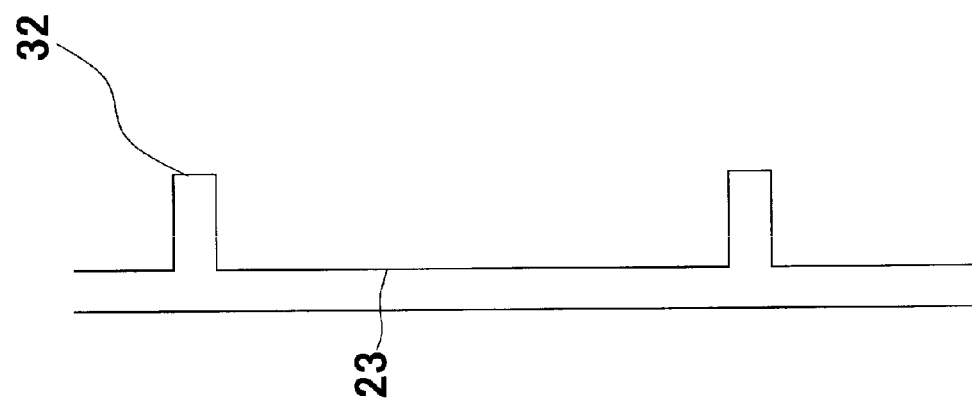
Fig. 6-1

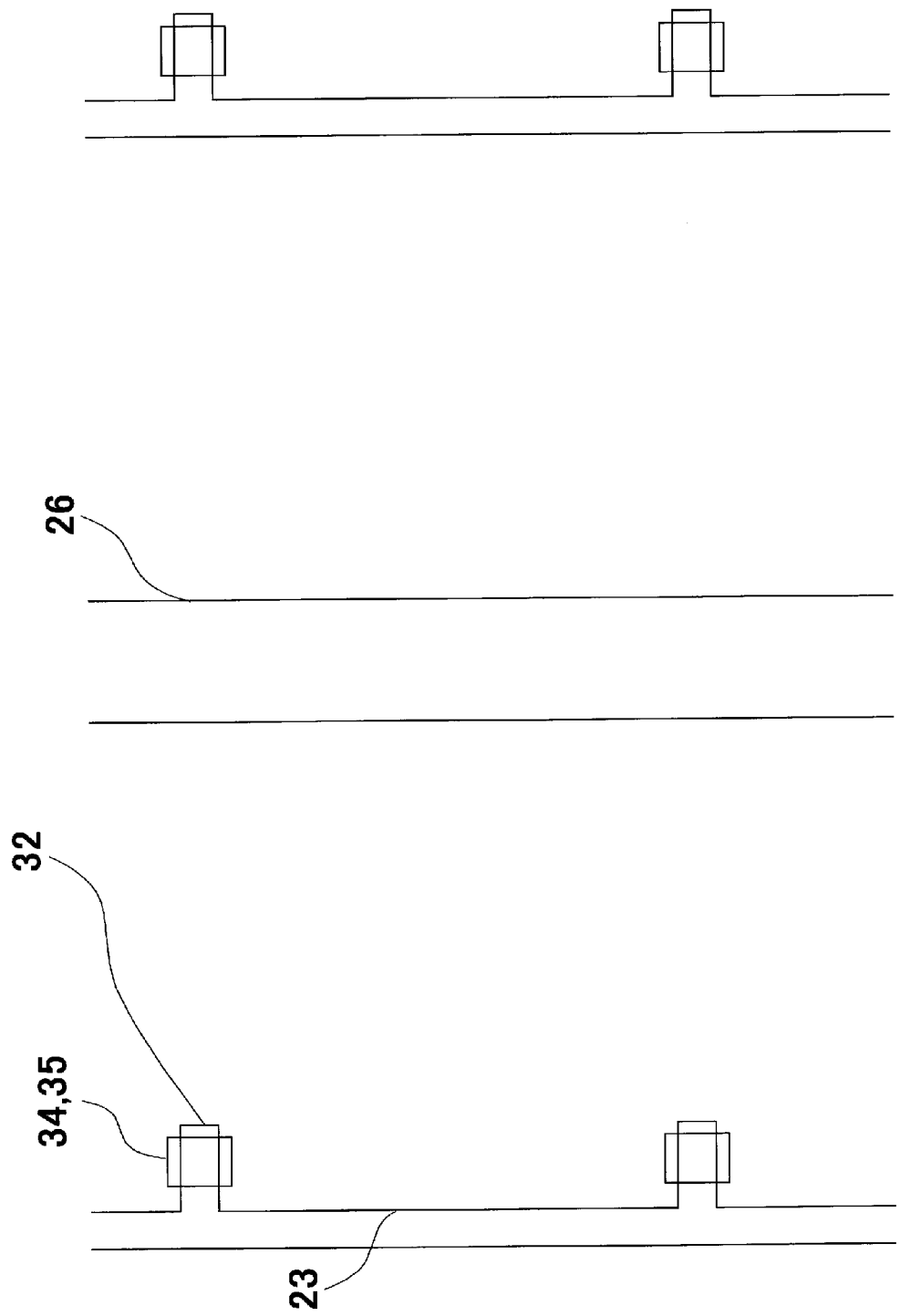

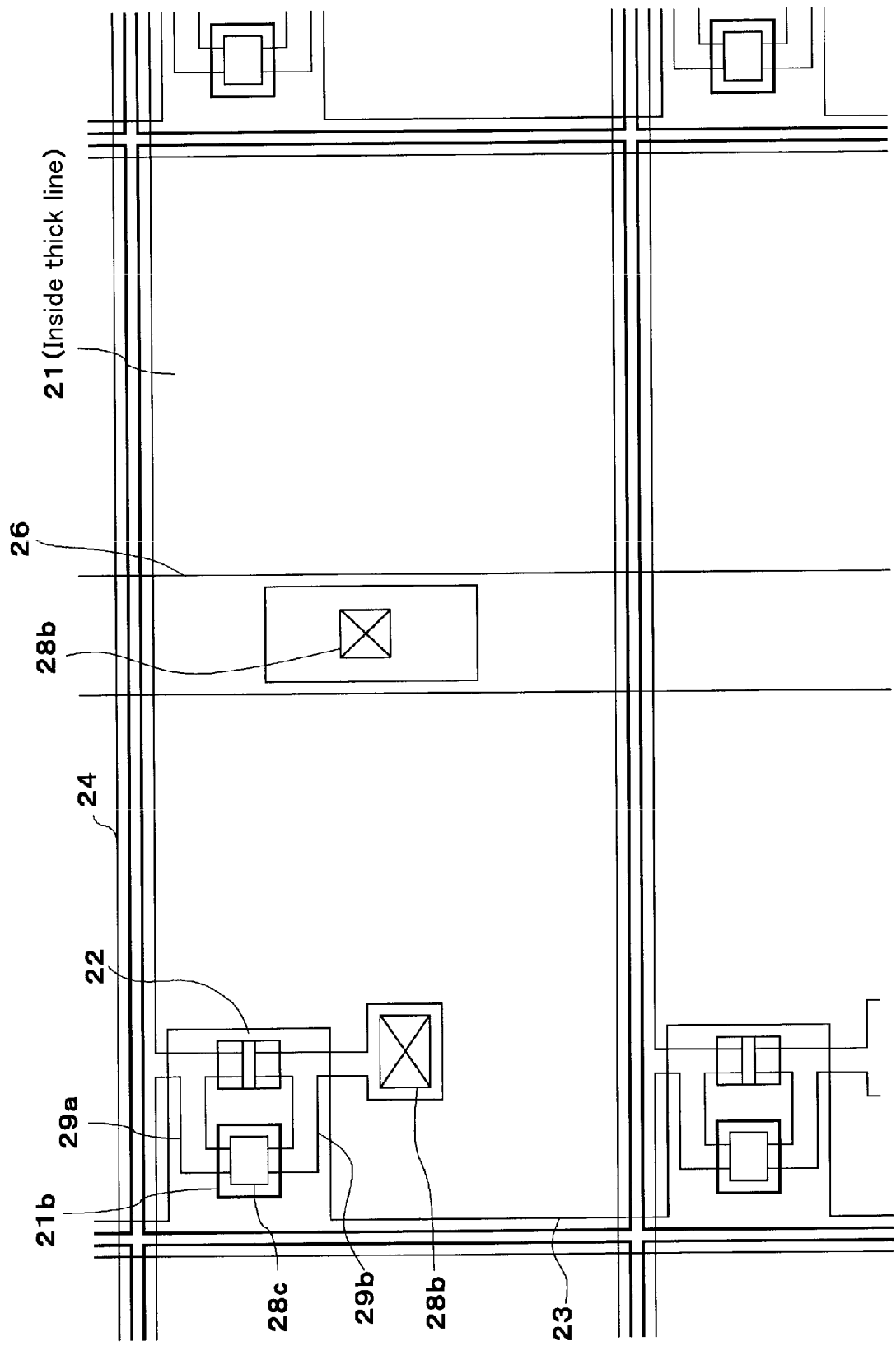

PRODUCTION METHOD OF ACTIVE MATRIX SUBSTRATE, ACTIVE MATRIX SUBSTRATE, AND LIQUID CRYSTAL DISPLAY DEVICE

BACKGROUND OF THE INVENTION

1. Field of the Invention

The present invention relates to a production method of an active matrix substrate, an active matrix substrate, and a liquid crystal display device. More specifically, the present invention relates to a production method of an active matrix substrate in which an interlayer insulating film effective for improvement in aperture ratio is formed, an active matrix substrate, and a liquid crystal display device obtained by using the same.

2. Description of the Related Art

Active matrix substrates have been widely used in active matrix display devices such as a liquid crystal display device and an EL (Electroluminescence) display device. In an active matrix substrate used in a conventional active matrix liquid crystal display device, a switching element such as a TFT (Thin Film Transistor) 52 is disposed at each intersection of a plurality of scanning signal lines 53 with a plurality of data signal lines 54, as shown in FIG. 13, and by its switching function, a pixel signal is transmitted to each pixel (variable capacitance) 50 and a storage capacitance 55.

With respect to a configuration of an active matrix substrate used in a conventional active matrix liquid crystal display device, a configuration in which an interlayer insulating film formed by an organic film with high transparency is formed above a TFT, a scanning signal line, and a data signal line, and over the interlayer insulating film, a pixel electrode made of a transparent conductive material is formed, is known (for example, refer to Japanese Kokai Publication No. Hei-09-152625 1). In such a configuration, with respect to an electrical connection between the pixel electrode with a drain electrode of the TFT, (1) the pixel electrode, (2) a contact hole formed in the interlayer insulating film on a pattern of a storage capacitance (common) wiring or the scanning signal line, (3) a storage capacitance upper electrode, (4) a drain leading wiring, (5) a drain electrode of the TFT, are connected and conducted to each other in this order. In such an active matrix substrate including the pixel electrode formed on the interlayer insulating film, the pixel electrode can be formed to overlap each signal line, and therefore the aperture ratio can be increased and an effect of shielding an electric field from each signal line to the pixel electrode can be obtained.

In production steps of such an active matrix substrate, static electricity is generated between electrodes or between wirings formed on a supporting substrate due to friction when the substrate is transported, a plasma treatment in dry etching or ashing, a shower of an etching solution or a cleaning solution to the substrate, and the like, and thereby charging is generated. An insulating substrate is generally used as a support substrate of the active matrix substrate. Therefore, a difference in electric potential, generated by the induced static electricity, is poorly eliminated, and when the difference in electric potential between electrodes or between wirings exceeds a dielectric strength voltage of an insulating film, electric discharge occurs. As a result, electrostatic discharge (ESD) (also, referred to as electrostatic breakdown) of the insulating film, heat generation of the semiconductor, and the like, may be generated. If they occur, unrecoverable permanent breakdown, partially recoverable semi-permanent breakdown, characteristic degradation due to variation of a threshold voltage or reduction in mobility, and further reduction in long-term reliability due to potential defects, may be generated in TFTs.

A method of forming a wiring for short-circuit (also referred to as short-circuit wiring) for short-circuiting a plurality of scanning signal lines or data signal lines, thereby preventing generation of differences in electric potential between electrodes or wirings was disclosed as a conventional method of preventing such electrostatic discharge (for example, refer to Japanese Kokai Publication No. Hei-11-15017, Japanese Kokai Publication No. 2000-235195, Japanese Kokai Publication No. Hei-11-109416, and Japanese Kokai Publication No. Hei-09-61850). For example, in Japanese Kokai Publication No. Hei-11-15017, Japanese Kokai Publication No. 2000-235195, and Japanese Kokai Publication No. Hei-11-109416, a ring-shaped conductor pattern (short ring) is formed around a display region where pixel electrodes are disposed in a matrix pattern. Such a wiring for short-circuit such as a short ring is separated from electrodes or wirings by laser irradiation, separation of the substrate, and the like, in a step after completion of an active matrix substrate. As a result, the short-circuit between the electrodes or the wirings can be eliminated, and thereby the active matrix substrate can function normally.

However, such a conventional method of forming the wiring for short-circuit has room for improvement in that a difference in electric potential between a source electrode and a drain electrode of a TFT disposed in each pixel can not be eliminated although a difference in electric potential between scanning signal lines or between data signal lines, or between a scanning signal line and a data signal line, can be eliminated by forming the wiring for short-circuit. In the production steps of the active matrix substrate, the source electrode and the drain electrode are generally formed by separating a low resistance semiconductor layer by channel etching. In this case, the source electrode is connected to the wiring for short-circuit through the data signal line, but the drain electrode is connected to only the data signal line (or the source electrode) through a high resistance semiconductor layer. Therefore, the drain electrode is electrically isolated, and the electrical isolation is not eliminated even after a contact hole or a pixel electrode is formed in a step performed later. Therefore, charging easily occurs, and difference in electric potential between the drain electrode and the source electrode tends to be generated. As a result, if this difference in electric potential exceeds a dielectric strength voltage at a TFT channel, electrostatic discharge at the TFT channel occurs.

A method of forming a wiring for short-circuit for conducting a source electrode to a drain electrode was disclosed as a conventional method of eliminating such a difference in electric potential generated between the source electrode and the drain electrode of the TFT disposed in each pixel (for example, refer to Japanese Kokai Publication No. Hei-08-114815, Japanese Kokai Publication No. 2001-133807, and Japanese Kokai Publication No. 2001-255557).

However, the above-mentioned method in which during preparation of the TFTs, the wiring for short-circuit for temporarily conducting the source electrode to the drain electrode is formed to prevent the electrical isolation of the drain electrode from the source electrode has room for improvement in that an additional step of separating the wiring for short-circuit is needed. Japanese Kokai Publication No. Hei-08-114815, Japanese Kokai Publication No. 2001-133807, and Japanese Kokai Publication No. 2001-255557 fail to disclose a method of disposing the wiring for short-circuit and a position where the wiring for short-circuit is separated without reduction in transmittance when the wiring for short-circuit is disposed in a pixel, and have room for improvement also in that an aperture ratio of the pixel is reduced when the wiring for short-circuit is disposed in the pixel. Further, in Japanese Kokai Publication No. 2001-133807, the wiring for short-circuit is made of polysilicon, and therefore has a resistance about 100 times larger than that of a low resistance metal material such as aluminum and molybdenum generally used for forming the data signal line. Therefore, there is room for improvement in that such a wiring for short-circuit is difficult to sufficiently function.

SUMMARY OF THE INVENTION

In order to overcome the problems described above, preferred embodiments of the present invention provide a production method of an active matrix substrate, capable of preventing an increase in the number of production steps and simultaneously preventing electrostatic discharge at a TFT channel; an active matrix substrate; and a liquid crystal display device obtained using the same.

The present inventors made various investigations of methods for producing an active matrix substrate having a configuration in which a pixel electrode is formed on an interlayer insulating film, which is effective for increase in aperture ratio and the like, the methods being capable of preventing an increase in the number of production steps and simultaneously preventing electrostatic discharge at a TFT channel. The inventors studied a method of separating a short-circuit wiring. Then, the inventors discovered that an increase in the number of production steps is prevented and simultaneously electrostatic discharge at a TFT channel can be prevented by a method in which a short-circuit wiring for connecting a data signal line or a source electrode to a drain electrode or a drain side circuit is formed first, and then, an upper insulating film having an opening for short-circuit wiring separation and a transparent conductive film are successively formed at a region above the short-circuit wiring, as upper layers of the short-circuit wiring, and finally, at least the transparent conductive film inside the opening for short-circuit wiring separation and the short-circuit wiring below the opening for short-circuit wiring separation are removed, thereby performing patterning of the pixel electrode and separation of short-circuit wiring in the same step. As a result, the above-mentioned problems have been advantageously solved, leading to completion of preferred embodiments of the present invention.

According to a preferred embodiment of the present invention, a production method of an active matrix substrate including, on a substrate, a thin film transistor in which a gate electrode connected to a scanning signal line, and a source electrode connected to a data signal line and a drain electrode connected to a drain side circuit are formed through (across) a lower insulating film; and a pixel electrode connected to the drain side circuit through a contact hole formed in an upper insulating film, wherein the production method includes the steps of: (1) forming a short-circuit wiring for connecting the data signal line or the source electrode to the drain electrode or the drain side circuit (short-circuit wiring-forming step); (2) forming the upper insulating film as an upper layer of the short-circuit wiring (insulating film-forming step); (3) forming an opening for contact hole formation in the upper layer insulating film (opening for contact hole formation-forming step); (4) forming an opening for short-circuit wiring separation at a region above the short-circuit wiring in the upper insulating film (opening for short-circuit wiring separation-forming step); (5) forming a transparent conductive film on the upper insulating film and inside the openings to form a contact hole (contact hole-forming step); and (6) removing at least the transparent conductive film inside the opening for short-circuit wiring separation and the short-circuit wiring below the opening for short-circuit wiring separation to perform patterning of the pixel electrode and separation of the short-circuit wiring (pixel electrode-patterning and short-circuit wiring-separating step).

In the description of preferred embodiments of the present invention, the above-mentioned contact hole means a wiring formed by forming the conductive film inside a through-hole of the upper insulating film. The above-mentioned drain side circuit means an electrode or a wiring below the upper insulating film formed between the drain electrode of the thin film transistor (TFT) and the contact hole. The above-mentioned short-circuit wiring is not especially limited as long as it is a wiring capable of connecting the data signal line or the source electrode to the drain electrode or the drain side-circuit, thereby forming short-circuit therebetween. Preferred embodiments of the above-mentioned short-circuit wiring include a preferred embodiment in which the data signal line is connected to the drain electrode, a preferred embodiment in which the data signal line is connected to the drain side circuit, a preferred embodiment in which the source electrode is connected to the drain electrode, and a preferred embodiment in which the source electrode is connected to the drain side circuit.

In preferred embodiments of the present invention, it is preferable that the step of forming the short-circuit wiring is performed together with a step of forming the data signal line and the drain side circuit. As a result, the short-circuit wiring for preventing electrostatic discharge at the TFT channel can be formed without an increase in the number of production steps. Increases in production costs also can be prevented by forming the above-mentioned components using the same material. In the description of various preferred embodiments of the present invention, the above-mentioned "performed together with" means that two or more steps are related to each other, and for example, includes the case where the two or more steps are entirely performed simultaneously, the case where the two or more steps are partly performed simultaneously, and the step order of the two or more steps is mixed (a process in one step and a process in another step are alternately performed).

It is preferable that the step of forming the short-circuit wiring is performed together with a step of forming a wiring for connecting the data signal lines to each other at a non-display region. As a result, the wiring for connecting the data signal lines can be formed without an increase in the number of production steps, and a difference in electric potential between the data signal lines can be substantially uniform. As a result, the electrostatic discharge at the TFT channel can be effectively prevented even if the data signal line or the source electrode, which is not used in the same pixel, is used as a data signal line or a source electrode short-circuited with the drain electrode or the drain side circuit. The wiring for connecting the data signal lines, formed at a non-display region (a region outside of the display region where the pixel electrodes are disposed in a matrix pattern), is also referred to as a short ring when formed in a ring shape.

Further, it is preferable that in the step of forming the short-circuit wiring, the short-circuit wiring is formed to overlap a pattern of the scanning signal line, the storage capacitance wiring, or the gate electrode. The region where the scanning signal line, the storage capacitance wiring, or the gate electrode are formed on the active matrix substrate is a region which does not function as a transmissive region (opening). Therefore, it can be possible to dispose the short-circuit wiring inside the pixel without reduction in aperture ratio. The storage capacitance (common) wiring constitutes a storage capacitance element. The storage capacitance element is constituted by a pair of electrodes overlapping each other with an insulating film therebetween. One of the electrodes is electrically connected to the pixel electrode. If the storage capacitance element having such a configuration is disposed, deterioration of a pixel signal, caused by self-discharge of the liquid crystal layer while the TFT is at OFF-state or off-state current of the TFT, can be prevented. The storage capacitance element may be used not only for maintaining the image signal during the OFF-state of the TFT but also as a route for applying various modulation signals in liquid crystal driving. Therefore, if the storage capacitance element is formed, electrical consumption can be reduced and image quality can be improved in liquid crystal display devices. For example, Japanese Kokai Publication No. Hei-06-95157 (page 1) discloses that the storage capacitance element is formed in each pixel. The storage capacitance (common) wiring functions as the other electrode (an electrode not electrically connected to the pixel electrode) of the storage capacitance element, and is generally disposed as an electrode on the lower side of the storage capacitance element (storage capacitance lower electrode).

It is preferable that the step of forming the opening for contact hole formation is performed together with the step of forming the opening for short-circuit wiring separation. As a result, an increase in the number of production steps, attributed to the formation of the opening for short-circuit wiring separation, can be effectively prevented.

The present invention also relates to an active matrix substrate produced by the production method of the active matrix substrate (hereinafter, also referred to as a first active matrix substrate). In such a first active matrix substrate according to another preferred embodiment of the present invention, the electrostatic discharge at the TFT channel during the production steps is prevented without deterioration of the productivity because the short-circuit wiring is formed by the simple method during the production steps. As a result, the first active matrix substrate according to a preferred embodiment of the present invention is excellent in long-term reliability of the TFTs because breakdown or characteristic degradation of the TFTs can be sufficiently prevented, and is also excellent in productivity.

According to yet another preferred embodiment of the present invention, an active matrix substrate includes, on a substrate, a thin film transistor in which a gate electrode connected to a scanning signal line, and a source electrode connected to a data signal line and a drain electrode connected to a drain side circuit are formed through (across) a lower insulating film; and a pixel electrode connected to the drain side circuit through a contact hole formed in an upper insulating film, wherein the active matrix substrate includes: a first extended portion extended from the data signal line or the source electrode; a second extended portion extended from the drain electrode or the drain side circuit; an opening of the upper insulating film, formed at a region including a space between an end of the first extended portion and an end of the second extended portion; and an opening of the pixel electrode, formed at a region including the opening of the upper insulating film (hereinafter, also referred to as a second active matrix substrate). Such a second active matrix substrate according to a preferred embodiment of the present invention can be produced by the above-mentioned production method of the active matrix substrate. That is, the first extended portion and the second extended portion can be formed by separating the short-circuit wiring below the opening for short-circuit wiring separation formed in the upper layer insulating film. In this case, the opening of the upper insulating film, formed at a region including a space between the end of the first extended portion and the end of the second extended portion, corresponds to the opening for short-circuit wiring separation. Further, an opening of the pixel electrode is formed at a region including the opening for short-circuit wiring separation in order to prevent short-circuiting between the first extended portion and the second extended portion. As mentioned above, also in the second active matrix substrate according to a preferred embodiment of the present invention, the electrostatic discharge at the TFT channel during the production steps is prevented without deterioration of the productivity because the short-circuit wiring is formed by the simple method during the production steps. As a result, the second active matrix substrate according to a preferred embodiment of the present invention is excellent in long-term reliability of the TFTs because breakdown or characteristic degradation of the TFTs in the substrate can be sufficiently prevented, and is also excellent in productivity.

It is preferable in the second active matrix substrate according to a preferred embodiment of the present invention that at least one of the opening of the upper insulating film, the first extended portion, and the second extended portion overlap a pattern of the scanning signal line, the storage capacitance wiring, or the gate electrode. The region where the scanning signal line, the storage capacitance wiring, or the gate electrode is formed on the active matrix substrate is generally a region which does not function as a transmissive region (opening). Therefore, the second active matrix substrate according to a preferred embodiment of the present invention can be produced by disposing the short-circuit wiring inside the pixel without reduction in aperture ratio.

Further, it is preferable that the data signal line, the first extended portion, and the second extended portion are formed by one or more layers, and a top layer contains molybdenum or a molybdenum-containing alloy. If the data signal line, the first extended portion, and the second extended portion are formed by one layer, the entire layer contains molybdenum or a molybdenum-containing alloy. If the to player contains molybdenum or a molybdenum-containing alloy, electrochemical corrosion caused by reaction with the transparent conductive film serving as the pixel electrode can be prevented and the top layer can be easily processed by etching using a chemical such as a mixed solution including nitric acid, phosphoric acid, and acetic acid. It is preferable that the top layer is made of only molybdenum or a molybdenum-containing alloy.

Further, it is preferable that the data signal line, the first extended portion, and the second extended portion are formed by two or more layers, and a lower layer contains aluminum or an aluminum-containing alloy. If the lower layer contains aluminum or an aluminum-containing alloy, a wiring having a sufficiently low resistance can be formed, and the lower layer can be easily processed by etching using a chemical such as a mixed solution including nitric acid, phosphoric acid, and acetic acid. The lower layer containing aluminum or an aluminum-containing alloy is not especially limited as long as it is a layer other than the top layer. It is preferable that the lower layer containing aluminum or an aluminum-containing alloy is made of only aluminum or an aluminum-containing alloy.

It is particularly preferable that the data signal line, the first extended portion, and the second extended portion are formed by two or more layers; the top layer contains molybdenum or a molybdenum-containing alloy; and a lower layer contains aluminum or an aluminum-containing alloy.

It is preferable that the pixel electrode contains indium tin oxide or indium zinc oxide. As a result, if the short-circuit wiring is made of molybdenum or a molybdenum-containing alloy, or aluminum or an aluminum-containing alloy, patterning of the pixel electrode and separation of the short-circuit wiring can be simultaneously performed by the etching process using a chemical such as a mixed solution including nitric acid, phosphoric acid, and acetic acid. Therefore, an increase in the number of production steps, attributed to formation of the short-circuit wiring, can be prevented and the production costs can be reduced.

Another preferred embodiment of the present invention provides a liquid crystal display device including the first or second active matrix substrate. Such a liquid crystal display device according to another preferred embodiment of the present invention is excellent in display quality or productivity, and it is particularly preferably used in a liquid crystal display panel such as a large liquid crystal TV for which high panel quality is needed.

According to another preferred embodiment of the present invention, a liquid crystal display device includes the first or second active matrix substrate; a color filter substrate including at least one of a black matrix, a projection for liquid crystal alignment control, and an electrode slit for liquid crystal alignment control; and liquid crystal filled between the active matrix substrate and the color filter substrate, wherein at least one of the opening of the upper insulating film, the first extended portion, and the second extended portion in the active matrix substrate overlaps a pattern of the black matrix, the projection for liquid crystal alignment control, or the electrode slit for liquid crystal alignment control. The projection for liquid crystal alignment control and the electrode slit for liquid crystal alignment control are a projective structure and an electrode notch, used for liquid crystal alignment division in MVA (Multi-domain Vertical Alignment) mode, respectively. The region where the black matrix, the projection for liquid crystal alignment control, or the electrode slit for liquid crystal alignment control is formed is a region not used as a transmissive region, generally. Therefore, according to a preferred embodiment of the liquid crystal display device of the present invention, the short-circuit wiring can be disposed in a pixel without any reduction in aperture ratio. It is more preferable that the opening of the upper insulating film, the first extended portion, and the second extended portion on the active matrix substrate overlap at least one of the patterns of black matrix, the projection for liquid crystal alignment control, and the electrode slit for liquid crystal alignment control. The arrangement pattern of the projection for liquid crystal alignment control and the electrode slit for liquid crystal alignment control is not especially limited, and may be a linear pattern or a point-like pattern.

According to a production method of the active matrix substrate of a preferred embodiment of the present invention, the short-circuit wiring is formed in the active matrix substrate, and thereby the difference in electric potential between the source electrode and the drain electrode of the TFT after channel-etching (after formed) can be eliminated, which is not eliminated only by the short ring between the scanning signal lines or between the data signal lines. In addition, the short-circuit wiring can be formed and separated by the simple method, and therefore any reduction in productivity can be reliably prevented. Therefore, according to the production method of the substrate of a preferred embodiment of the present invention, electrostatic discharge at a TFT channel is prevented without reducing productivity, and production yield can be improved.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 4A to 4F are schematic cross-sectional views showing production flow of the active matrix substrate according to a preferred embodiment of the present invention when viewed from the cross-section shown in FIG. 2.

FIG. 6-1 is a schematic planar view showing production flow of the active matrix substrate according to a preferred embodiment of the present invention (first step).

FIG. 6-2 is a schematic planar view showing the production flow of the active matrix substrate according to a preferred embodiment of the present invention (second step).

FIG. 6-3 is a schematic planar view showing the production flow of the active matrix substrate according to a preferred embodiment of the present invention (third step).

FIG. 6-4 is a schematic planar view showing the production flow of the active matrix substrate according to a preferred embodiment of the present invention (fourth step).

FIG. 6-5 is a schematic planar view showing the production flow of the active matrix substrate according to a preferred embodiment of the present invention (sixth step).

FIGS. 7A and 7B are equivalent circuit diagrams showing a circuit configuration of the active matrix substrate according to a preferred embodiment of the present invention, wherein FIG. 7A shows the configuration before separation of a short-circuit wiring, and FIG. 7B shows the configuration after separation of the short-circuit wiring.

FIGS. 9A and 9B are equivalent circuit diagrams showing a circuit configuration of the active matrix substrate according to a preferred embodiment of the present invention, wherein FIG. 9A shows the configuration before separation of a short-circuit wiring, and FIG. 9B shows the configuration after separation of the short-circuit wiring.

FIG. 11 is a planar view schematically showing a configuration of one pixel of the active matrix substrate according to a further preferred embodiment of the present invention.

FIGS. 12A and 12B are equivalent circuit diagrams showing a circuit configuration of the active matrix substrate according to a preferred embodiment of the present invention, wherein FIG. 12A shows the configuration before separation of a short-circuit wiring, and FIG. 12B shows the configuration after separation of the short-circuit wiring.

DETAILED DESCRIPTION OF PREFERRED EMBODIMENTS

The present invention is described below in more detail with reference to preferred embodiments thereof and the drawings, but the present invention in no way is limited to only these preferred embodiments.

Figure 1:
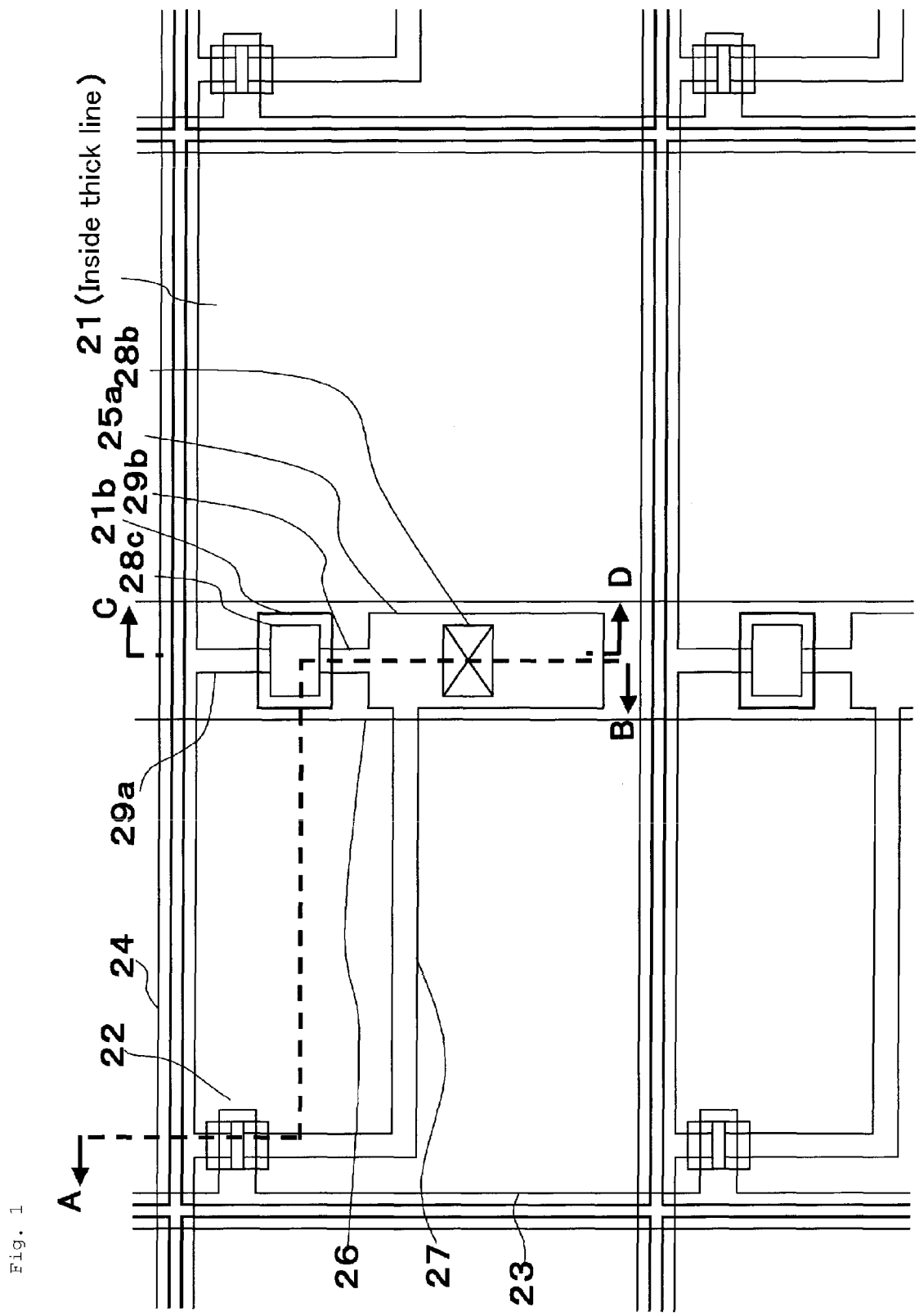
FIG. 1 is a planar view schematically showing a configuration of one pixel of the active matrix substrate according to a preferred embodiment of the present invention.
Figure 2:
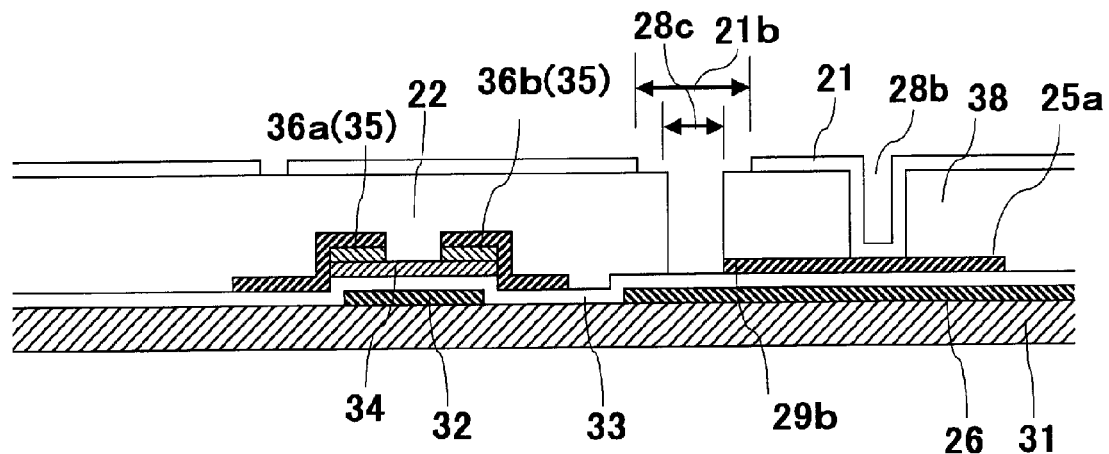
FIG. 2 is a cross-sectional view schematically showing a cross-section of the active matrix substrate taken along line A-B in FIG. 1.
Figure 3:
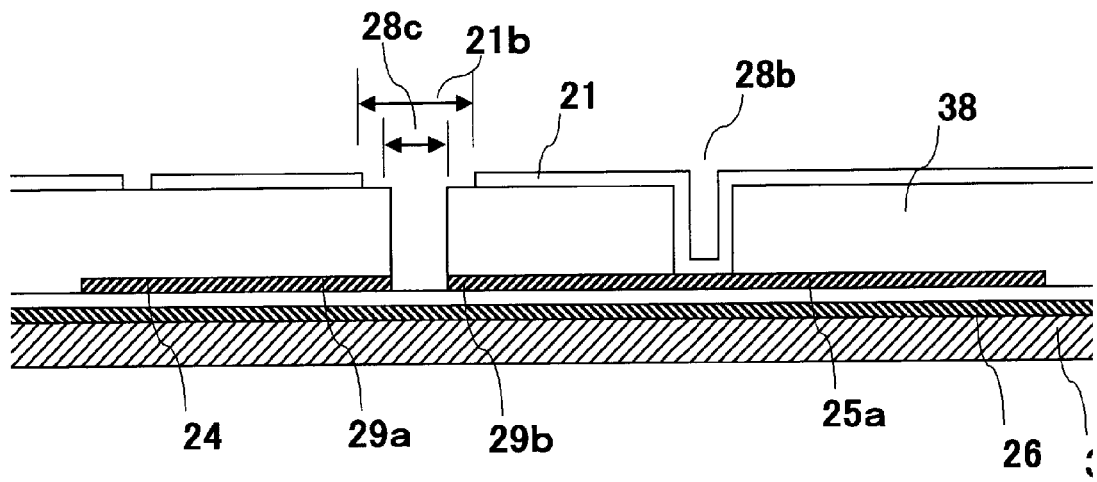
FIG. 3 is a cross-sectional view schematically showing a cross-section of the active matrix substrate taken along line C-D in FIG. 1.
Figures 3, 6:
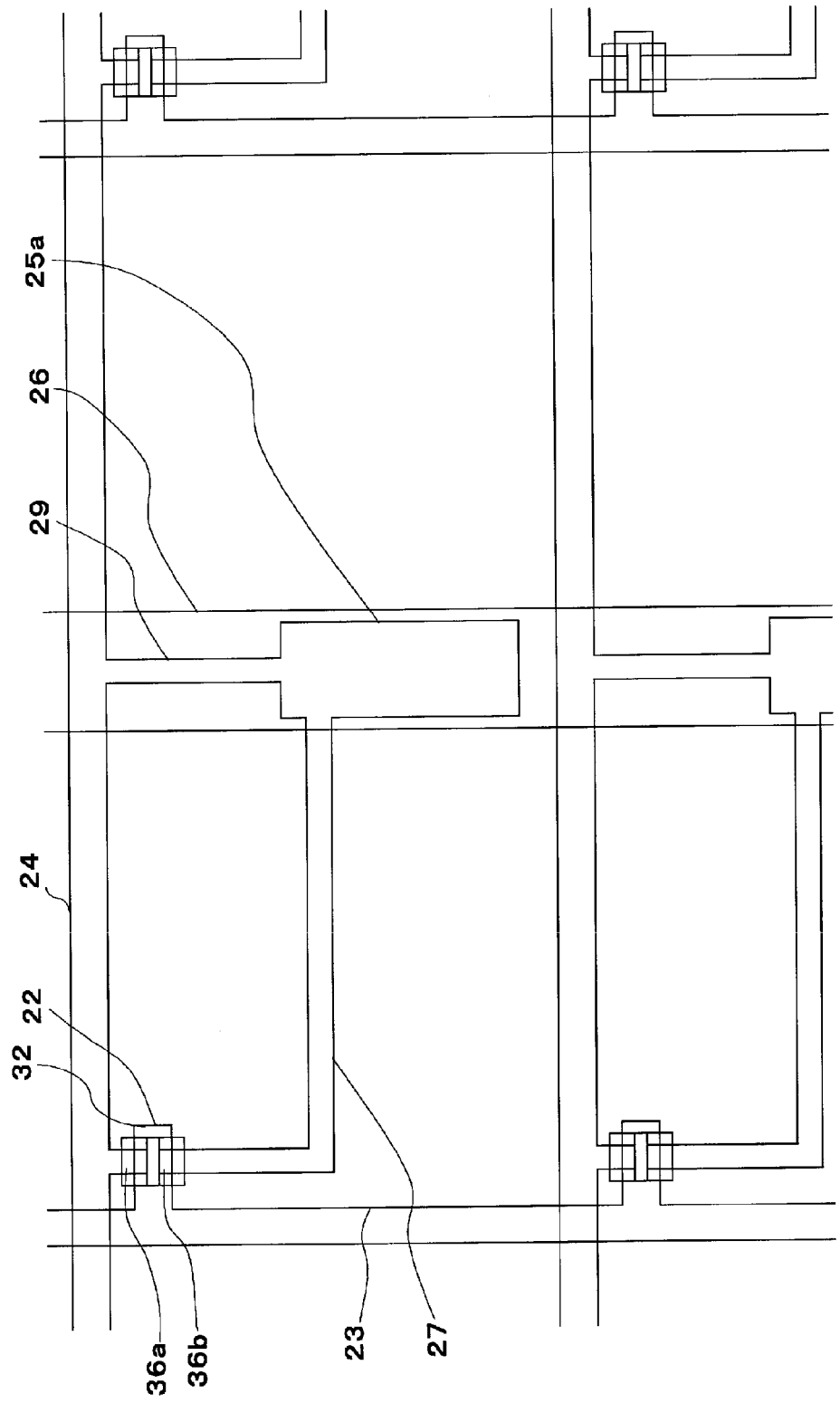
Figures 4, 6:
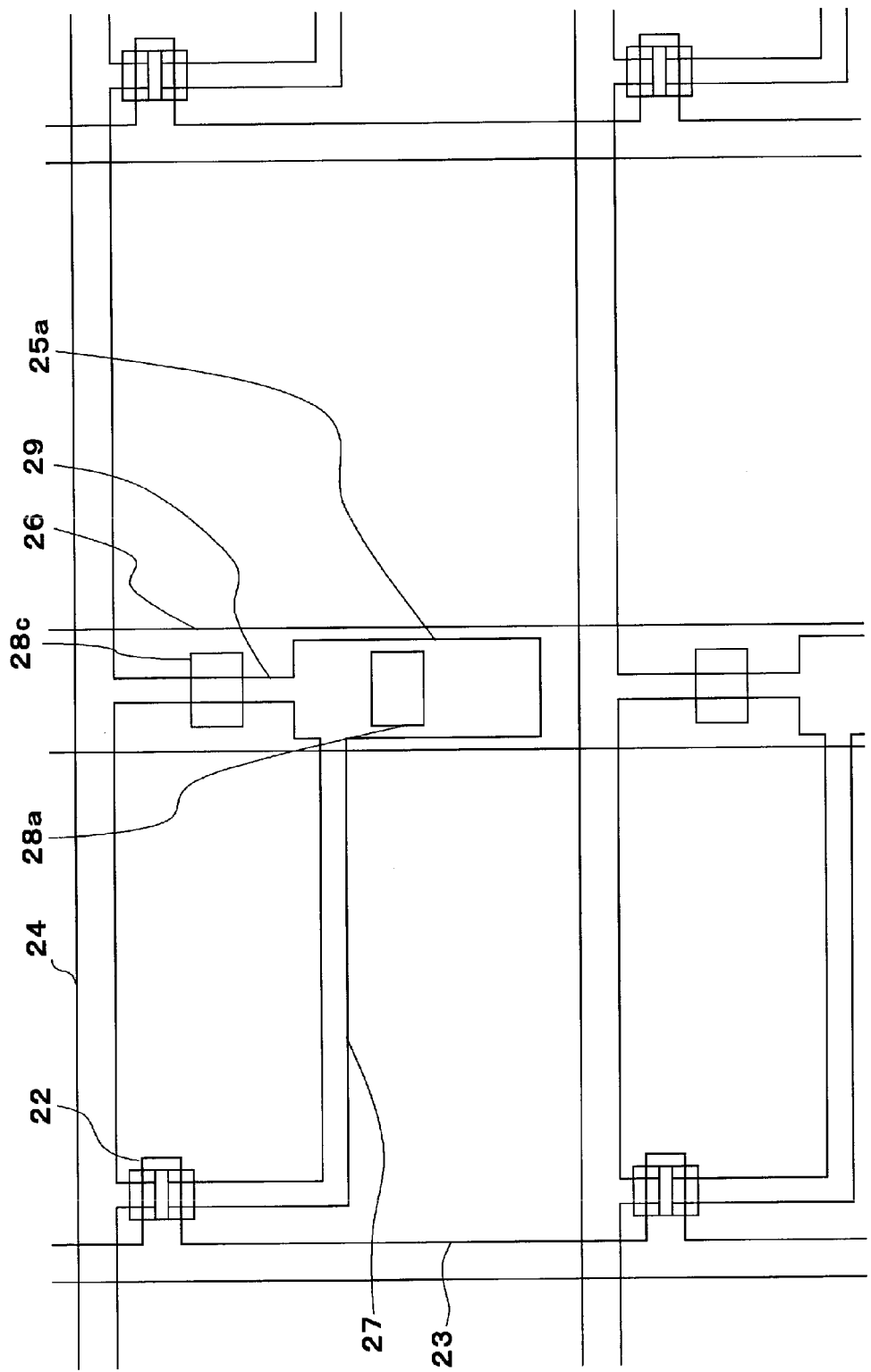
Figures 5, 6:
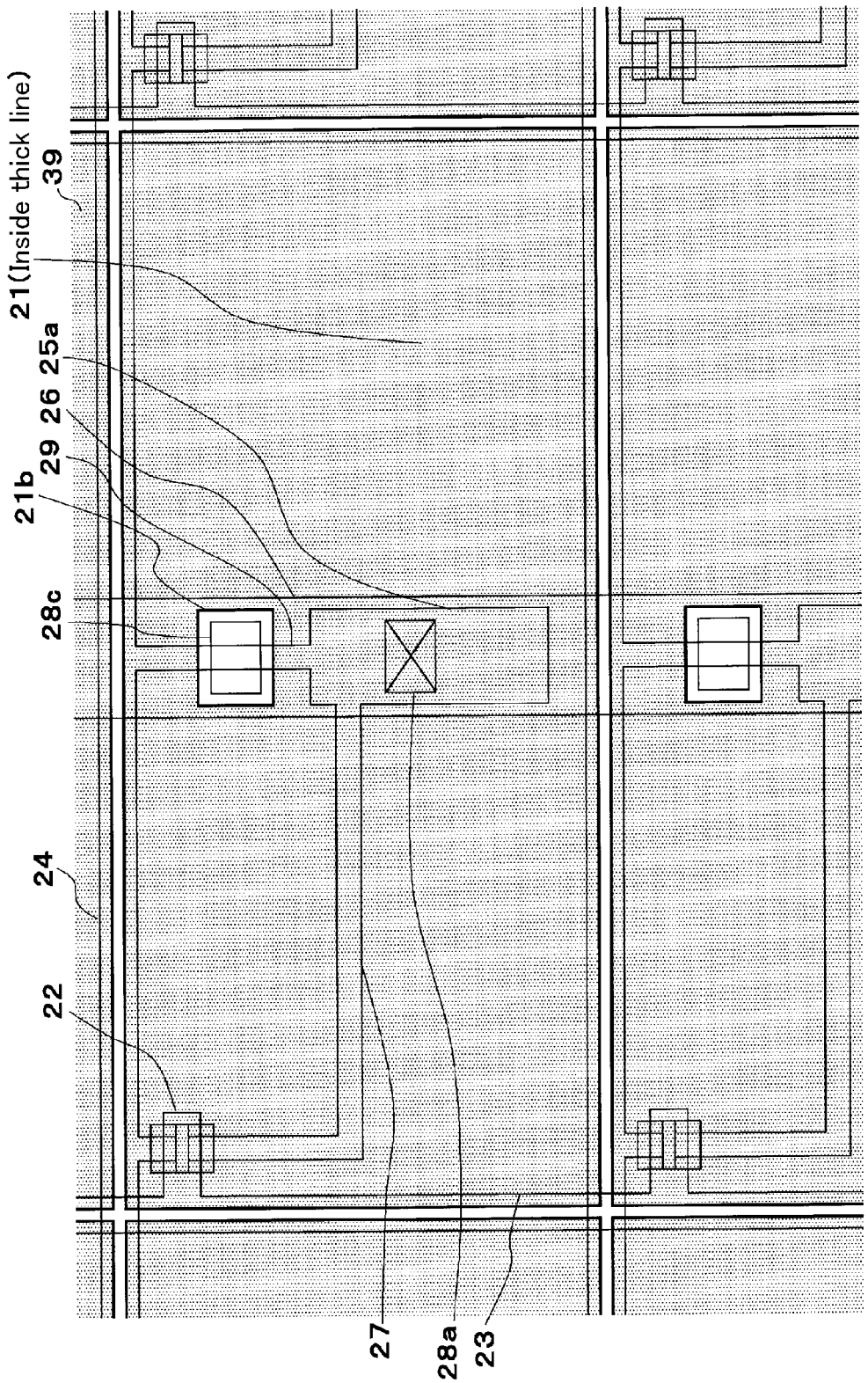
Figure 7A:
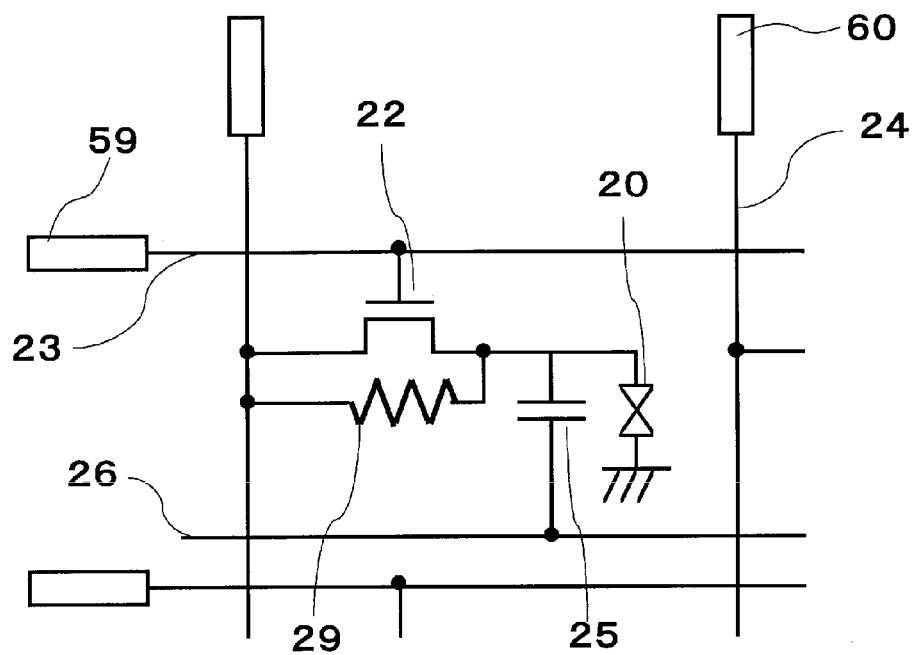
Figure 7B:
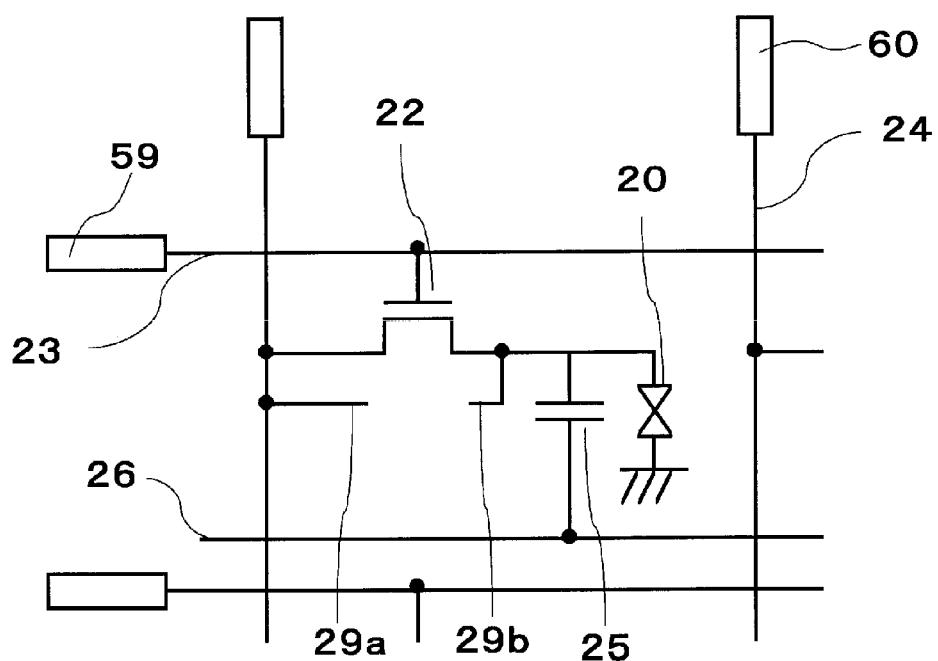

A first preferred embodiment of the present invention is described below with reference to FIGS. 1 to 7B. FIG. 1 is a planar view schematically showing a configuration of one pixel of an active matrix substrate according to the first preferred embodiment. FIGS. 2 and 3 are cross-sectional views schematically showing the active matrix substrate according to the first preferred embodiment taken along lines A-B and C-D in FIG. 1, respectively. FIGS. 4A to 4F and FIGS. 5A to 5F are cross-sectional views schematically showing the active matrix substrate according to the first preferred embodiment when viewed from the cross-section shown in FIGS. 2 and 3, respectively. FIGS. 6-1 to 6-5 are planar views schematically showing production flow of the active matrix substrate according to the first preferred embodiment. FIGS. 7A and 7B are equivalent circuit diagrams showing a circuit configuration of the active matrix substrate according to the first preferred embodiment, wherein FIG. 7A shows the configuration before separation of a short-circuit wiring, and FIG. 7B shows the configuration after separation of the short-circuit wiring.

As shown in FIG. 1, on an active matrix substrate according to the first preferred embodiment, a plurality of pixel electrodes 21 are disposed in a matrix pattern, and scanning signal lines 23 for supplying a scanning signal and data signal lines 24 for supplying a data signal (display signal) are arranged to surround the pixel electrodes 21 and intersect with each other. At each intersection of the scanning signal lines 23 with the data signal lines 24, a thin film transistor (TFT) 22 as a switching element connected to the pixel electrode 21 is disposed. To a gate electrode of the TFT 22, the scanning signal line 23 is connected, and the TFT 22 is driven and controlled by a scanning signal input into the gate electrode. To a source electrode of the TFT 22, the data signal line 24 is connected, and a data signal is input into the source electrode of the TFT 22. To a drain electrode of the TFT 22, a drain leading wiring (drain side circuit) 27, a storage capacitance upper electrode (drain side circuit) 25a as one electrode of a storage capacitance (element) 25 (shown in FIGS. 7A and 7B), and the pixel electrode 21 through a contact hole 28b are connected. The contact hole 28b is not necessarily positioned on the storage capacitance upper electrode 25a, and may be positioned on the drain leading wiring 27. However, it is preferable that the contact hole 28 is formed on the storage capacitance upper electrode 25a overlapping a pattern of a storage capacitance (common) wiring 26 that is the other electrode of the storage capacitance (element) 25 because an aperture ratio is not further reduced, as shown in FIG. 1.

In the active matrix substrate having such a configuration according to the first preferred embodiment, a scanning signal and a data signal are externally input through a scanning signal line external input terminal 59 (shown in FIGS. 7A and 7B) and a data signal line external input terminal 60 (shown in FIGS. 7A and 7B), each formed at a region around the display region (non-display region) where the pixel electrodes 21 are disposed in a matrix pattern. The scanning signal input into the gate electrode of the TFT 22 through the scanning signal line 23 drives and controls the TFT 22, and while the TFT 22 is driven, the data signal input into the source electrode of the TFT 22 through the data signal line 24 is input into the pixel electrode 21.

The storage capacitance (common) wiring 26 functions as the other electrode (storage capacitance lower electrode) of the above-mentioned storage capacitance element 25 and is disposed to be parallel with the scanning signal line 23. The storage capacitance element 25 is disposed in each pixel to be parallel with a liquid crystal capacitance of a liquid crystal layer interposed between the pixel electrode 21 formed in an active matrix substrate and a counter electrode formed in a counter substrate (color filter substrate). This storage capacitance element 25 can prevent deterioration of the pixel signal, caused by self-discharge of the liquid crystal layer while the TFT 22 is in an OFF-state or OFF-state current of the TFT 22, and can be used as a route for applying various modulation signals in liquid crystal driving, and is effective in reducing electrical consumption and improving image quality. In the first preferred embodiment, a storage capacitance element in a Cs-on-Common system is provided. The Cs-on-Common system is a system in which a storage capacitance wiring is disposed as a storage capacitance lower electrode, and such a storage capacitance wiring defines a storage capacitance element, together with a storage capacitance upper electrode overlapping the storage capacitance wiring through an insulating film.

As shown in FIGS. 1 to 3, in the active matrix substrate according to the first preferred embodiment, an opening for short-circuit wiring separation 28c is formed to penetrate an interlayer insulating film (upper insulating film) 38. The end of a first extended portion 29a connected to the data signal line 24 and the end of a second extended portion 29b extended from the storage capacitance upper electrode 25a face each other across a region of the opening for short-circuit wiring separation 28c. That is, the region of the opening for short-circuit wiring separation 28c separates the first extended portion 29a from the second extended portion 29b. The extended portions 29a and 29b and the opening for short-circuit wiring separation 28c are formed at a region overlapping a pattern of the storage capacitance (common) wiring 26.

Further, at the region of the short-circuit wiring separation 28 and its periphery region, the pixel electrode 21 is not formed, but an opening of the pixel electrode (notched part) 21b is formed. Therefore, the drain electrode of the TFT 22 is connected to the pixel electrode 21 only through the contact hole 28b.

The first extended portion 29a is connected to the second extended portion 29b during the production steps of the active matrix substrate, and then separated in a patterning step of the pixel electrode, as mentioned below.

The production method of the active matrix substrate according to the present preferred embodiment is described below with reference to FIGS. 4A to 6-5.

First Step (FIGS. 4A, 5A, and 6-1)

On the entire surface of a transparent insulating substrate 31 made of glass, plastic, and the like, a metal film made of titanium, chrome, aluminum, molybdenum, and the like, or a film made of an alloy of such metals, or a stacked film of such films, is formed by a sputtering method and the like to have a thickness of substantially 3000 Å. Then, the formed film is patterned by a photolithography method and the like to form the gate electrode 32, the scanning signal line 23, the storage capacitance (common) wiring 26, and the scanning signal line external input terminal 59 (shown in FIGS. 7A and 7B).

Second Step (FIGS. 4B, 5B, and 6-2)

On the entire surface of the substrate shown in FIG. 4A and the like, a silicon nitride film serving as a gate insulating film (lower insulating film) 33 (film thickness of substantially 4000 Å), an amorphous silicon film serving as a high resistance semiconductor layer 34 (film thickness of substantially 1500 Å), an n$^+$ amorphous silicon film in to which impurities such as phosphorus are doped, serving as a low resistance semiconductor layer 35 (film thickness of substantially 500 Å), are successively formed. Then, patterning is performed by a photolithography method and the like such that the amorphous silicon film and the n$^+$ amorphous silicon film remain at a region above the gate electrode 32, where a TFT is formed. The n$^+$ amorphous silicon film is divided into a source electrode 36a and a drain electrode 36b in a channel-etching step performed later.

Third Step Short-Circuit Wiring-Forming Step (FIGS. 4C, 5C, and 6-3)

On the entire surface of the substrate shown in FIG. 4B and the like, a lower layer made of aluminum or an aluminum-containing alloy and the top layer made of molybdenum or a molybdenum-containing alloy are formed by a sputtering method to have a total thickness of about 2000 Å. The data signal line 24, the drain leading wiring 27, the storage capacitance upper electrode 25a and the data signal line external input terminal 60 (shown in FIGS. 7A and 7B) are formed by patterning using a photolithography method and the like, and simultaneously, a short-circuit wiring 29 connecting the data signal line 24 to the storage capacitance upper electrode 25a is formed by patterning. The data signal line 24, the storage capacitance upper electrode 25a and the short-circuit wiring 29 are formed to have the above-mentioned film configuration, and thereby the electrochemical corrosion can be prevented because the molybdenum or the molybdenum-containing alloy constituting the upper layer is connected to ITO or IZO even if the storage capacitance upper electrode 25a is connected to ITO or IZO constituting the pixel electrode 21, which is different from the case where the top layer is made of aluminum and the like. In addition, the lower layer is made of aluminum or an aluminum-containing alloy, and thereby a low resistance wiring can be formed.

Then, channel etching is performed to remove a portion of the low resistance semiconductor layer 35 and separate the source electrode 36a from the drain electrode 36b. As a result, the TFT 22 is formed.

According to a conventional embodiment in which the short-circuit wiring 29 is not formed, the source electrode 36a and the drain electrode 36b will be connected to each other only through the high resistance semiconductor layer 34 in the TFT 22 later. Therefore, difference in electric potential is generated between the drain electrode 36a and the source electrode 36b, and electrostatic discharge easily occurs at the TFT channel. In contrast, according to the present preferred embodiment, the source electrode 36a is short-circuited with the drain electrode 36b by the short-circuit wiring 29. Accordingly, the difference in electric potential is hardly generated, and therefore generation of the electrostatic discharge at the TFT channel can be prevented.

Fourth Step Insulating Film-Forming Step and Opening-Forming Step (FIGS. 4D, 5D, and 6-4)

On the entire surface of the substrate shown in FIG. 4C and the like, an inorganic insulating film made of silicon nitride, silicon oxide, and the like, an organic insulating film made of (photosensitive) acrylic resin, polyimide resin, and the like, or a stacked film of these films, is formed. The inorganic insulating film is formed by a sputtering method and the like, and the organic insulating film is formed by a spin coating method, a slit coating method, and the like. In this case, a silicon nitride film is formed to have a film thickness of substantially 2000 Å and successively a photosensitive acrylic resin film is formed to have a film thickness of substantially 30000 Å. The use of the photosensitive organic insulating film eliminates need for additional resist application when photolithography is performed, and the production steps can be reduced.

Then, by a photolithography method and the like, an opening for contact hole formation 28a is formed and an opening of the interlayer insulating film 38 is formed at a region forming the scanning signal line external input terminal 59 (shown in FIGS. 7A and 7B) and the data signal line external input terminal 60 (shown in FIGS. 7A and 7B). In the same step, the opening for short-circuit wiring separation 28c is formed.

Figure 5A:
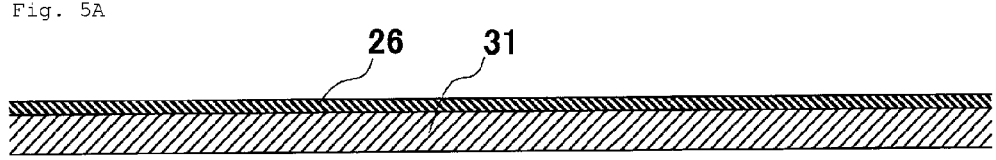
FIGS. 5A to 5F are schematic cross-sectional views showing production flow of the active matrix substrate according to a preferred embodiment of the present invention when viewed from the cross-section shown in FIG. 3.
Figure 5B:
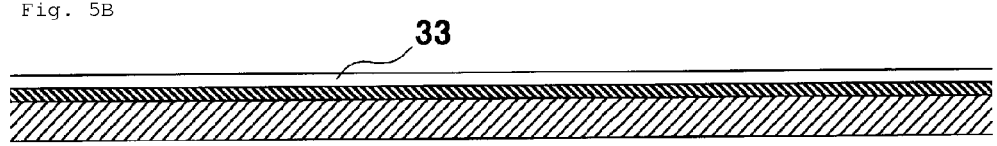
Figure 5C:
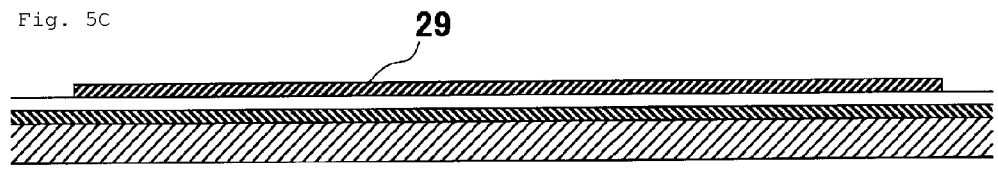
Figure 5D:
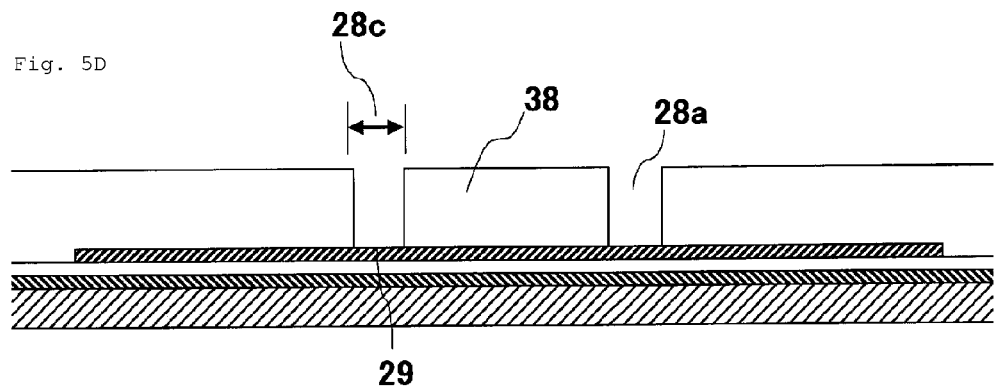
Figure 5E:
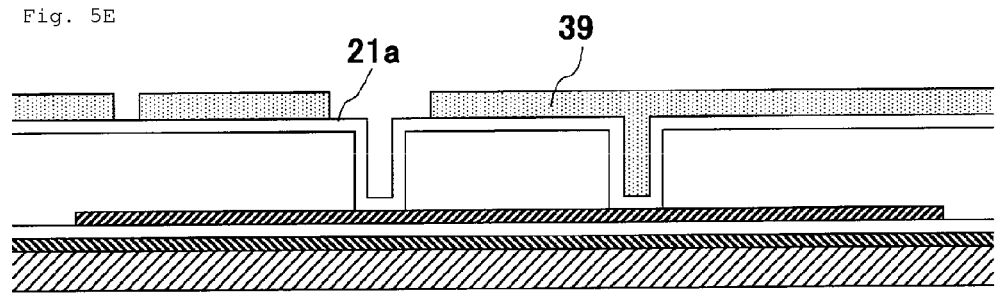
Figure 5F:
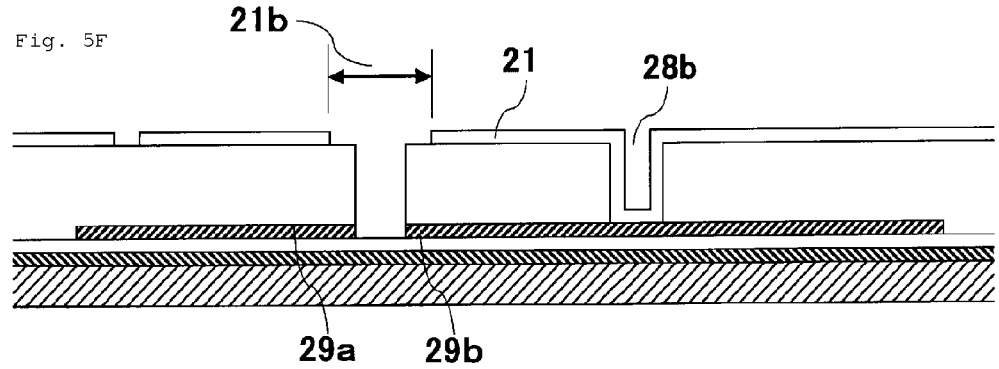

Fifth Step Contact Hole-Forming Step (FIGS. 4E and 5E)

On the entire surface of the substrate shown in FIG. 4D and the like, a film made of ITO (Indium Tin Oxide), IZO (Indium Zinc Oxide), zinc oxide, tin oxide, and the like, is formed to have a thickness of about 1000 Å as a transparent conductive film 21a serving as the pixel electrode 21. As a result, the contact hole 28b is completed.

Then, a photoresist pattern 39 for patterning the transparent conductive film 21a is formed by a photolithography method including resist application, exposure, and development. In such a case, the photoresist pattern 39 is a pattern not covering the opening for short-circuit wiring separation 28c of the interlayer insulating film and its surroundings.

Sixth Step Pixel Electrode Patterning and Short-Circuit Wiring-Separation Step (FIGS. 4F, 5F, and 6-5)

Using the photoresist pattern 39 formed in the above-mentioned fifth step as a mask, the transparent conductive film 21a made of ITO, IZO, and the like, is formed by patterning using wet etching. A mixed solution including nitric acid, phosphoric acid, and acetic acid is used as a chemical for the wet etching. At this time, the transparent conductive film 21a inside the opening for short-circuit wiring separation 28c is removed and simultaneously, the short-circuit wiring 29 positioned below the opening for short-circuit wiring separation is separated. The opening provided for the photoresist pattern 39 is formed to be larger than the opening for short-circuit wiring separation 28c of the interlayer insulating film 38. Therefore, a short-circuit between the remainder (the first extended portion) 29a of the short-circuit wiring 29 on the data signal line side after separation of the short-circuit wiring 29 and the pixel electrode 21 (source-drain leak) can be prevented inside the interlayer insulating film 38.

Finally, the photoresist pattern 39 is removed. As a result, an active matrix substrate is formed.

According to the present preferred embodiment, the short-circuit wiring 29 is formed in the active matrix substrate to have a circuit configuration shown in FIG. 7A. As a result, the difference in electric potential between the source electrode 36a and the drain electrode 36b of the TFT 22, generated after the TFT channel is formed, can be eliminated, which is not eliminated only by the short ring between the scanning signal lines 23 or between the data signal lines 24, and thereby the electrostatic discharge at the TFT channel can be prevented. In addition, the short-circuit wiring 29 is separated in the patterning step of the pixel electrode 21 to have a circuit configuration shown in FIG. 7B, and thereby it can be prevented that the data signal from the data signal line 24 is directly input into the pixel electrode 21. As a result, if a liquid crystal display device is produced using the active matrix substrate according to the present preferred embodiment, a (variable) capacitance 20 constituted by the pixel electrode 21, the liquid crystal (layer), and the counter electrode (in the counter substrate) is controlled and a high-definition liquid crystal display can be realized.

According to the present preferred embodiment, an increase in the number of production steps, attributed to the formation and separation of the short-circuit wiring 29, can be prevented. Further, the short-circuit wiring 29 is formed to overlap the storage capacitance wiring 26 pattern, and thereby reduction in aperture ratio, attributed to the formation of the short-circuit wiring 29, can be prevented.

In the present preferred embodiment, the stacked film including the lower layer made of aluminum or an aluminum-containing alloy and the top layer made of molybdenum or an molybdenum-containing alloy is used as the data signal line 24, the drain leading wiring 27, the storage capacitance upper electrode 25a, the data signal line external input terminal 60, and the short-circuit wiring 29. However, a metal film made of titanium, chrome, aluminum, molybdenum, and the like or an alloy of such metals, or a stacked film of such films may be used, as in the gate electrode 32, the scanning signal line 23, the storage capacitance (common) wiring 26, and the scanning signal line external input terminal 59.

Figure 8:
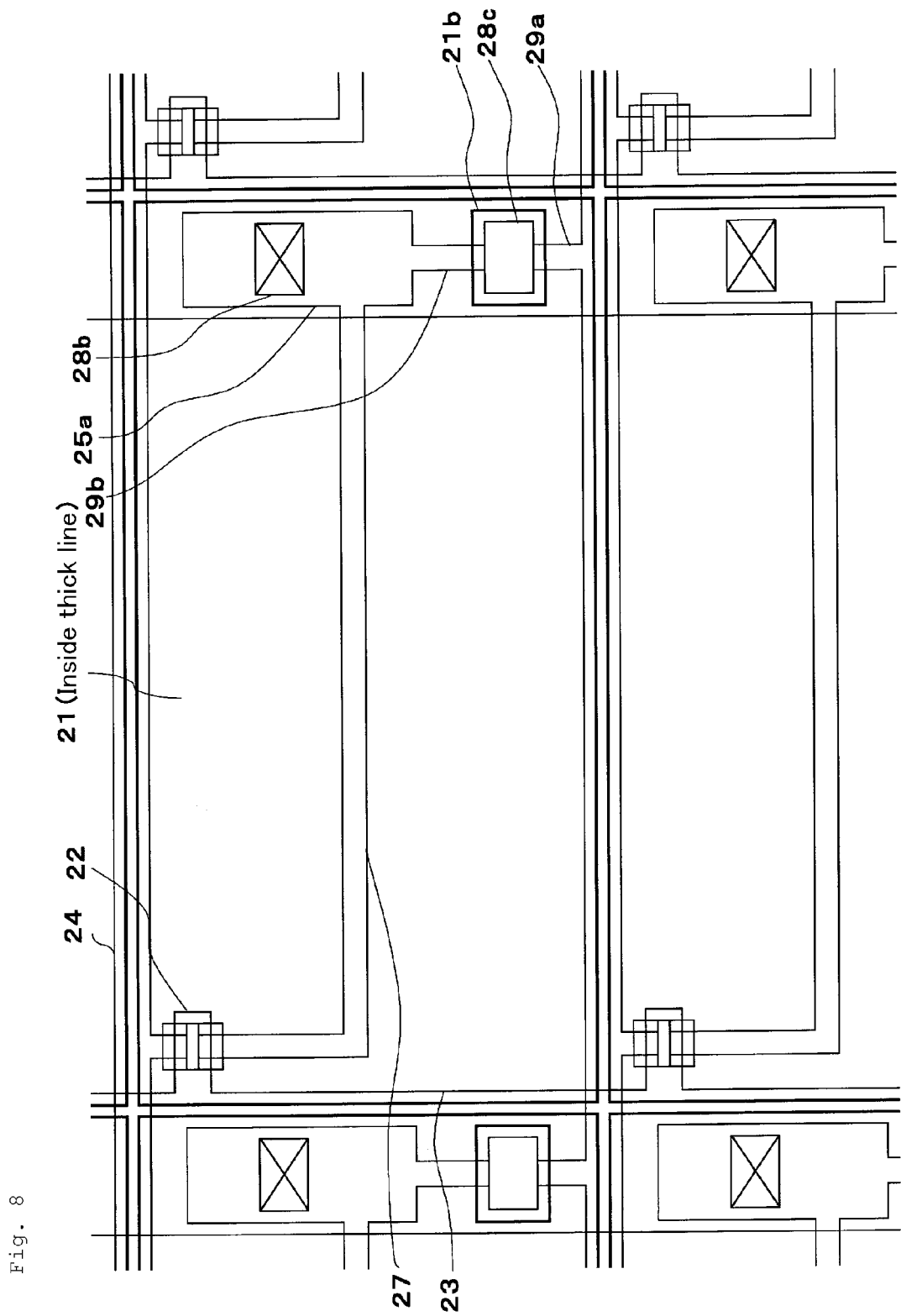
FIG. 8 is a planar view schematically showing a configuration of one pixel of the active matrix substrate according to another preferred embodiment of the present invention.
Figure 9A:
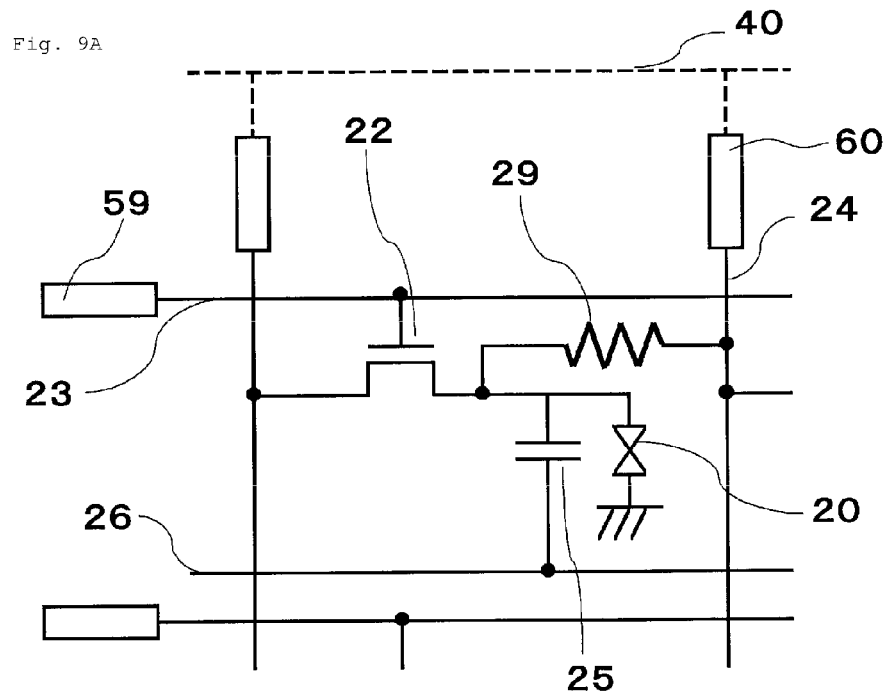
Figure 9B:
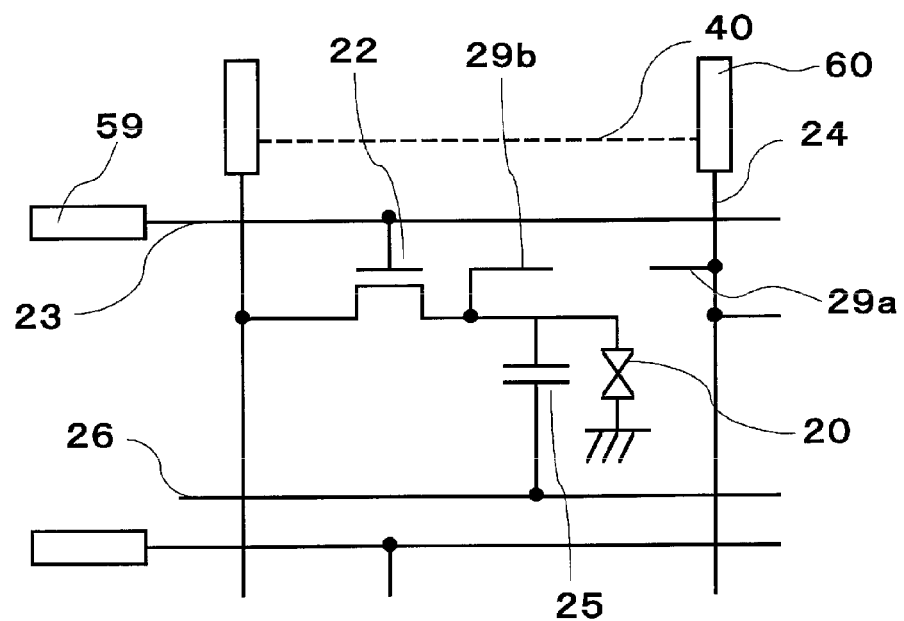

A second preferred embodiment of the present invention is described below with reference to FIGS. 8, 9A and 9B. FIG. 8 is a planar view schematically showing a configuration of one pixel of an active matrix substrate according to the second preferred embodiment. FIGS. 9A and 9B are equivalent circuit diagrams showing a circuit configuration of the active matrix substrate according to the second preferred embodiment, wherein FIG. 9A shows the configuration before separation of a short-circuit wiring, and FIG. 9B shows the configuration after separation of the short-circuit wiring.

The active matrix substrate according to the second preferred embodiment preferably has almost the same configuration as in the active matrix substrate according to first preferred embodiment, as shown in FIG. 8, except that (1) a storage capacitance element in Cs-on-Gate system is formed and that (2) a short-circuit wiring connected to an adjacent data signal line is used. The adjacent signal line (scanning signal line or data signal line) means a signal line adjacent to a signal line connected to an electrode of a TFT used for driving an arbitrary pixel.

With respect to (1), the Cs-on-Gate system means a system in which the storage capacitance (common) wiring is not disposed; an adjacent scanning signal line is used as a storage capacitance lower electrode; the adjacent scanning signal line constitutes a storage capacitance element together with a storage capacitance upper electrode overlapping the adjacent scanning signal line with an insulating film therebetween. Therefore, in the present preferred embodiment, the adjacent scanning signal line 23 also serves as the storage capacitance wiring 26. In FIGS. 9A and 9B, the adjacent scanning signal line 23 and the storage capacitance wiring 26 are separately shown for drawing convenience. According to the present preferred embodiment, the extended portions 29a and 29b, and the opening for short-circuit wiring separation 28c are formed at a region overlapping the adjacent scanning signal line 23 pattern, as shown in FIG. 8.

With respect to (2), in various preferred embodiments of the present invention, in addition to the data signal line (the data signal line connected to the TFT to which the drain electrode is connected), an adjacent data signal line (data signal line not connected to the drain electrode via the TFT) can be also connected to the drain electrode or the drain side circuit by the short-circuit wiring. In the present preferred embodiment, the short-circuit wiring 29 (shown in FIG. 9A) causes short-circuit between the drain leading wiring 27 connected to the drain electrode of the TFT 22 for driving and controlling its own pixel and the data signal line 24 connected to the source electrode of the TFT 22 for driving and controlling an adjacent pixel electrode. Therefore, the first extended portion 29a formed by separating the short-circuit wiring 29 is connected to an adjacent data signal line 24.

In the present preferred embodiment, it is preferable that a wiring (short ring) 40 for connecting the data signal lines 24 is disposed in the peripheral region of the display region where the pixel electrodes 21 are disposed in a matrix pattern (non-display region), as shown in FIGS. 9A and 9B. If such a short ring 40 is formed, the data signal lines 24 have the same electric potential. Therefore, even if the drain electrode or the drain side circuit is connected to the adjacent data signal line by the short-circuit wiring 29, difference in electric potential between the drain electrode and the source electrode at the TFT channel can be effectively eliminated, and therefore electrostatic discharge at the TFT channel can be effectively prevented.

It is preferable that the short ring 40 is made of the same material as the material for the data signal line 24, the drain leading wiring 27, and the storage capacitance upper electrode 25a in the same step, from viewpoint of suppression of increase in production steps. The short ring 40 is formed at the non-display region, and therefore can be separated in a step performed later. Further, in the step of forming the pixel electrode 21, the short-circuit wiring 29 is separated by wet etching and simultaneously the short ring 40 may be separated from the data signal line 24. In this case, a through-hole needs to be formed at a position where the short ring 40 is separated, but an additional production step is not needed, and therefore the production costs can be reduced.

According to the present preferred embodiment, the same functional effects of the present invention as in the first preferred embodiment can be achieved. In the present preferred embodiment, the short-circuit wiring 29 connected to the adjacent data signal line 24 is disposed to overlap the adjacent scanning signal line 23 pattern, and thereby reduction in aperture ratio, attributed to the formation of the short-circuit wiring 29, can be prevented. Therefore, as shown in FIG. 8, the extended portions 29a and 29b formed by separating the short-circuit wiring 29 are disposed to overlap the adjacent scanning signal line 23 pattern.

Third and fourth preferred embodiments of the present invention are described below with reference to FIGS. 10 to 12B.

Figure 10:
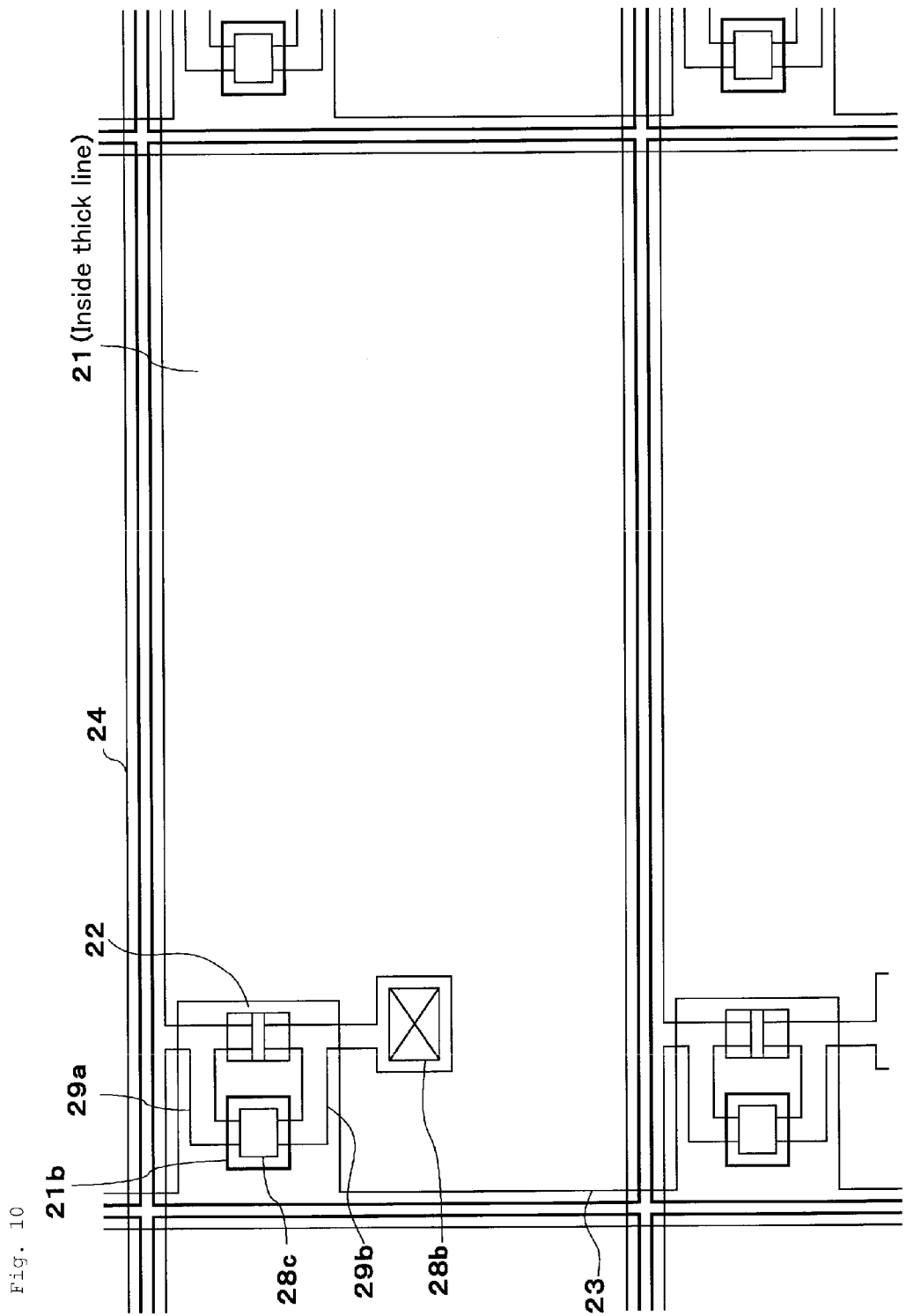
FIG. 10 is a planar view schematically showing a configuration of one pixel of the active matrix substrate according to yet another preferred embodiment of the present invention.
Figure 12A:
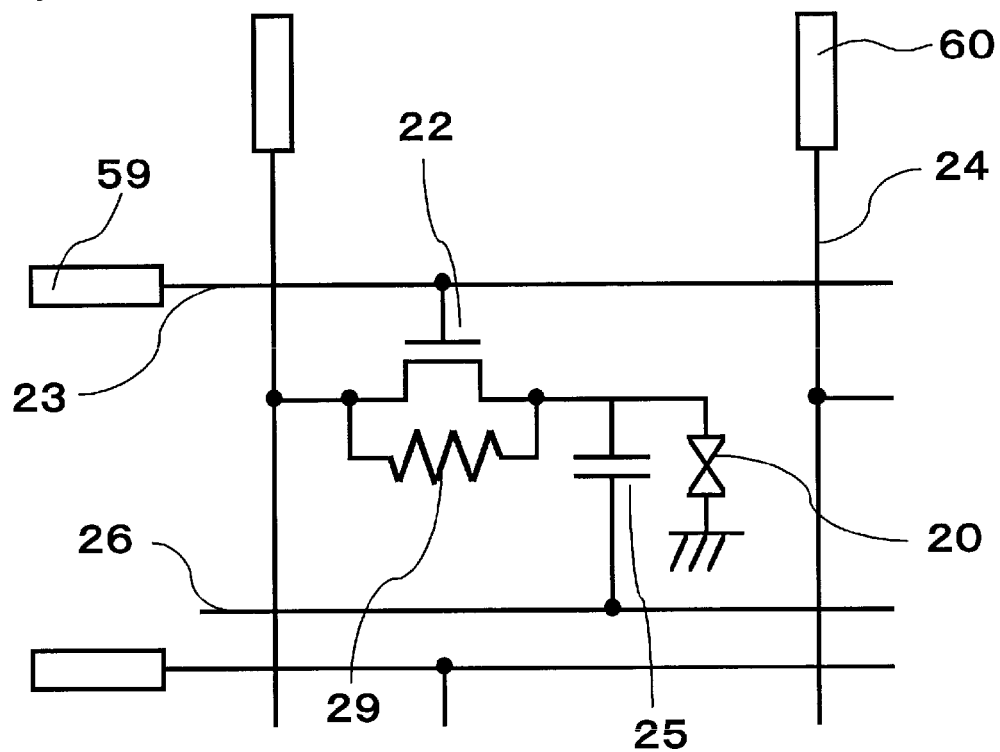
Figure 12B:
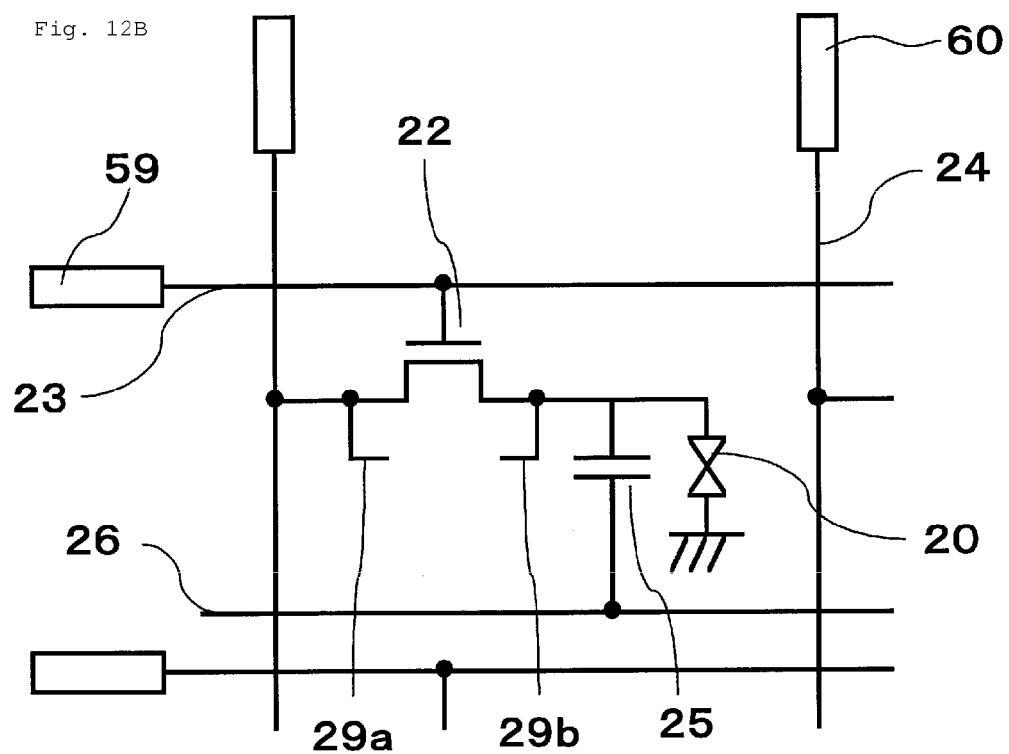
Figure 13:
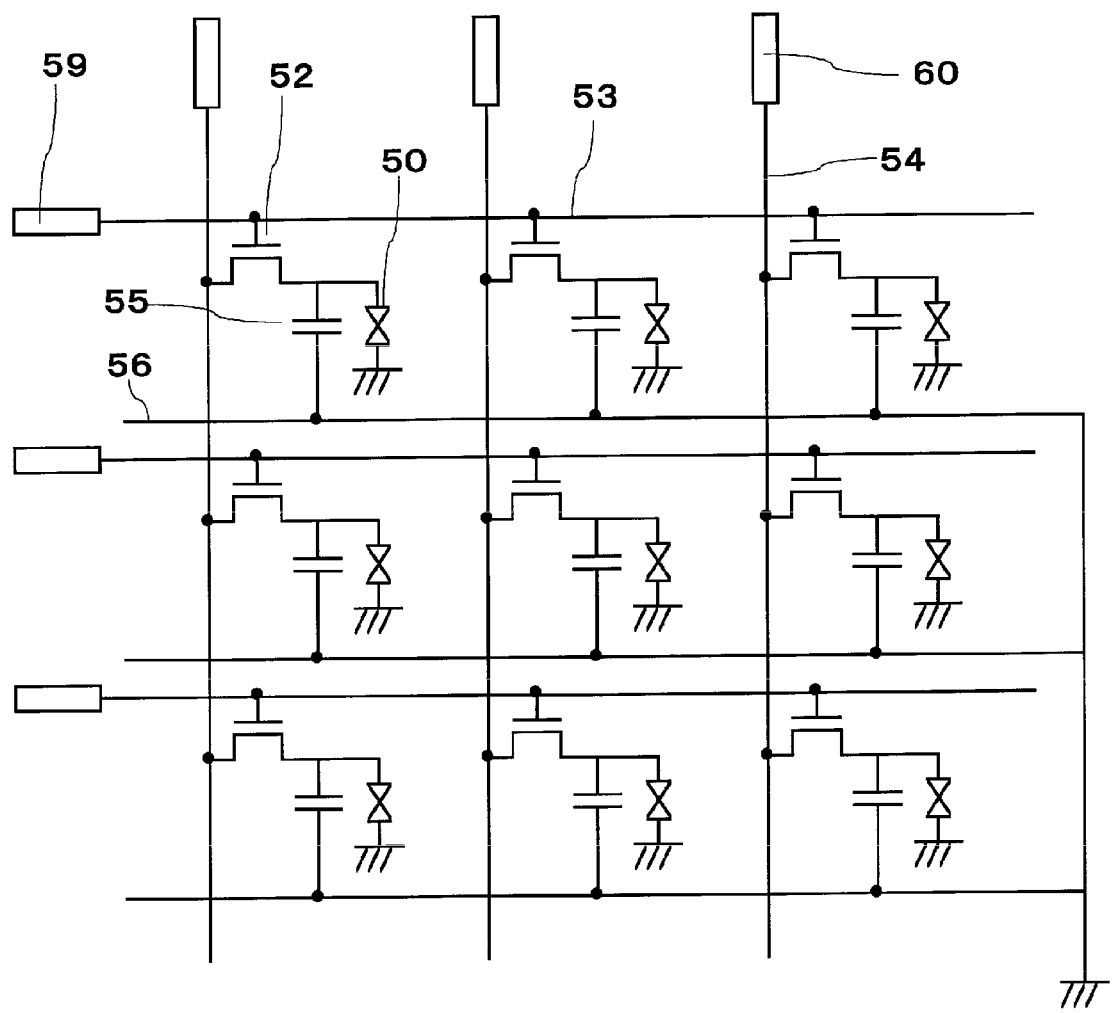
FIG. 13 is an equivalent circuit diagram showing the entire circuit of a conventional active matrix substrate.

FIG. 10 is a planar view schematically showing a configuration of one pixel of an active matrix substrate according to the third preferred embodiment. FIG. 11 is a planar view schematically showing a configuration of one pixel of an active matrix substrate according to the fourth preferred embodiment. FIGS. 12A and 12B are equivalent circuit diagram showing a circuit configuration of the active matrix substrate according to the fourth preferred embodiment, wherein FIG. 12A shows the configuration before separation of a short-circuit wiring, and FIG. 12B shows the configuration after separation of the short-circuit wiring.

In the active matrix substrates according to the third and fourth preferred embodiments, the drain leading wiring (drain side circuit) is not disposed and the drain electrode of the TFT 22 is connected to the pixel electrode 21 through the contact hole 28b, as shown in FIGS. 10 and 11.

The short-circuit wiring 29 is disposed at a region overlapping the gate electrode (scanning signal line 23) pattern of the TFT 22 to connect the source electrode of the TFT to the drain electrode, as shown in FIG. 12A, and separated in the pixel electrode-patterning step, as shown in FIG. 12B. After separation of the short-circuit wiring 29, the extended portions 29a, 29b, and the opening for short-circuit wiring separation 28c are formed at a region overlapping the gate electrode pattern of the TFT 22, as shown in FIGS. 10 and 11. In the fourth preferred embodiment, the storage capacitance upper electrode 25a connected to the pixel electrode 21 through the contact hole 28b and the storage capacitance wiring 26 are formed, and the storage capacitance element 25 is added to the configuration of the third preferred embodiment, as shown in FIG. 11.

According to the third and fourth preferred embodiments, the same functional effects of the present invention as in the first preferred embodiment can be achieved. In the third and fourth preferred embodiments, the short-circuit wiring 29 is disposed to overlap the gate electrode (scanning signal line 23) pattern of the TFT 22, and thereby a reduction in aperture ratio, attributed to the formation of the short-circuit wiring 29, can be prevented. Therefore, as shown in FIGS. 10 and 11, the extended portions 29a and 29b formed by separating the short-circuit wiring 29 are disposed to overlap the gate electrode (scanning signal line 23) pattern.

This non-provisional application claims priority (under 35 U.S.C. §119) of Patent Application No. 2005-128134 filed in Japan on Apr. 26, 2005, the entire contents of which are hereby incorporated by reference.

The term "or more" in the present description means that the value described is included. That is, the term "or more" means the described value and values more than the described value.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method of manufacturing an active matrix substrate having on a substrate, a thin film transistor in which a gate electrode connected to a scanning signal line, and a source electrode connected to a data signal line, and a drain electrode connected to a drain side circuit are formed through a lower insulating film, and a pixel electrode connected to the drain side circuit through a contact hole formed in an upper insulating film, the method comprising the steps of:
   forming a short-circuit wiring for connecting the data signal line or the source electrode to the drain electrode or the drain side circuit;
   forming the upper insulating film as an upper layer of the short-circuit wiring;
   forming an opening for contact hole formation in the upper layer insulating film;
   forming an opening for short-circuit wiring separation at a region above the short-circuit wiring in the upper insulating film;
   forming a transparent conductive film on the upper insulating film and inside the openings to form a contact hole; and
   removing at least the transparent conductive film inside the opening for short-circuit wiring separation and the short-circuit wiring below the opening for short-circuit wiring separation to perform patterning of the pixel electrode and separation of the short-circuit wiring.

2. The method according to claim 1, wherein the step of forming the short-circuit wiring is performed together with a step of forming the data signal line and the drain side circuit.

3. The method according to claim 1, wherein the step of forming the short-circuit wiring is performed together with a step of forming a wiring for connecting the data signal lines to each other at a non-display region.

4. The method according to claim 1, wherein in the step of forming the short-circuit wiring, the short-circuit wiring is formed to overlap a pattern of the scanning signal line, the storage capacitance wiring, or the gate electrode.

5. The method according to claim 1, wherein the step of forming the opening for contact hole formation is performed together with the step of forming the opening for short-circuit wiring separation.

6. An active matrix substrate produced by the method according to claim 1.

7. A liquid crystal display device comprising the active matrix substrate according to claim 6.

8. A liquid crystal display device comprising:
   the active matrix substrate of claim 6;
   a color filter substrate including at least one of a black matrix, a projection for liquid crystal alignment control, and an electrode slit for liquid crystal alignment control; and
   liquid crystal filled between the active matrix substrate and the color filter substrate; wherein
   at least one of the opening of the upper insulating film, the first extended portion, and the second extended portion in the active matrix substrate overlaps a pattern of the black matrix, the projection for liquid crystal alignment control, or the electrode slit for liquid crystal alignment control.

9. An active matrix substrate comprising:
   a substrate;
   a thin film transistor in which a gate electrode connected to a scanning signal line, and a source electrode connected to a data signal line and a drain electrode connected to a drain side circuit are disposed on the substrate through a lower insulating film; and
   a pixel electrode connected to the drain side circuit through a contact hole formed in an upper insulating film;
   a first extended portion extended from the data signal line or the source electrode;
   a second extended portion extended from the drain electrode or the drain side circuit;
   an opening of the upper insulating film, formed at a region including a space between an end of the first extended portion and an end of the second extended portion; and
   an opening of the pixel electrode, formed at a region including the opening of the upper insulating film.

10. The active matrix substrate according to claim 9, wherein at least one of the opening of the upper insulating film, the first extended portion, and the second extended portion overlaps a pattern of the scanning signal line, the storage capacitance wiring, or the gate electrode.

11. The active matrix substrate according to claim 9, wherein the data signal line, the first extended portion, and the second extended portion are defined by at least one layer, and a top layer of the last one layer contains molybdenum or a molybdenum-containing alloy.

12. The active matrix substrate according to claim 9, wherein the data signal line, the first extended portion, and the second extended portion are defined by at least two layers, and a lower layer of the at least two layers contains aluminum or an aluminum-containing alloy.

13. The active matrix substrate according to claim 9, wherein the pixel electrode contains indium tin oxide or indium zinc oxide.

14. A liquid crystal display device comprising the active matrix substrate of claim 9.

15. A liquid crystal display device comprising:
- the active matrix substrate of claim 9;
- a color filter substrate including at least one of a black matrix, a projection for liquid crystal alignment control, and an electrode slit for liquid crystal alignment control; and
- liquid crystal filled between the active matrix substrate and the color filter substrate; wherein
at least one of the opening of the upper insulating film, the first extended portion, and the second extended portion in the active matrix substrate overlaps a pattern of the black matrix, the projection for liquid crystal alignment control, or the electrode slit for liquid crystal alignment control.

* * * * *